(12) United States Patent
Dillon et al.

(10) Patent No.: US 8,784,757 B2
(45) Date of Patent: Jul. 22, 2014

(54) AIR TREATMENT PROCESS FOR DILUTE PHASE INJECTION OF DRY ALKALINE MATERIALS

(71) Applicant: ADA-ES, Inc., Highlands Ranch, CO (US)

(72) Inventors: Martin A. Dillon, Conifer, CO (US); Gregory M. Filippelli, Catonsville, MD (US)

(73) Assignee: ADA-ES, Inc., Highlands Ranch, CO (US)

( * ) Notice: Subject to any disclaimer, the term of this patent is extended or adjusted under 35 U.S.C. 154(b) by 0 days.

(21) Appl. No.: 13/645,138

(22) Filed: Oct. 4, 2012

(65) Prior Publication Data

US 2013/0034481 A1 Feb. 7, 2013

Related U.S. Application Data

(63) Continuation of application No. 13/045,076, filed on Mar. 10, 2011, now Pat. No. 8,383,071.

(60) Provisional application No. 61/542,972, filed on Nov. 19, 2010, provisional application No. 61/312,453, filed on Mar. 10, 2010, provisional application No. 61/542,972, filed on Oct. 4, 2011.

(51) Int. Cl.
| | |
|---|---|
| *B01D 53/10* | (2006.01) |
| *B01D 53/74* | (2006.01) |
| *B01D 53/81* | (2006.01) |
| *F25J 3/08* | (2006.01) |

(52) U.S. Cl.
USPC ........... 423/210; 423/220; 423/230; 422/168; 95/139; 96/108

(58) Field of Classification Search
USPC ............. 423/210, 220, 230; 422/168; 95/139; 96/108
See application file for complete search history.

(56) References Cited

U.S. PATENT DOCUMENTS

| | | |
|---|---|---|
| 174,348 A | 3/1876 | Brown |
| 202,092 A | 4/1878 | Breed |
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,955,574 A | 4/1934 | Benner et al. |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 2,844,112 A | 7/1958 | Muller |
| 3,004,836 A | 10/1961 | Thompson |
| 3,194,629 A | 7/1965 | Dreibelbis et al. |
| 3,288,576 A | 11/1966 | Pierron et al. |
| 3,332,755 A | 7/1967 | Kukin |
| 3,437,476 A | 4/1969 | Dotson et al. |
| 3,557,020 A | 1/1971 | Shindo et al. |
| 3,599,610 A | 8/1971 | Spector |
| 3,662,523 A | 5/1972 | Revoir et al. |
| 3,725,530 A | 4/1973 | Kawase et al. |
| 3,764,496 A | 10/1973 | Hultman et al. |
| 3,803,803 A | 4/1974 | Raduly et al. |
| 3,823,676 A | 7/1974 | Cook et al. |

(Continued)

FOREIGN PATENT DOCUMENTS

| | | |
|---|---|---|
| AU | 2003/220713 | 2/2004 |
| CA | 1140572 | 2/1983 |

(Continued)

OTHER PUBLICATIONS

"ADA-ES Tests New Boiler Product," Coal Daily, Apr. 18, 2000, 1 page.

(Continued)

*Primary Examiner* — Timothy Vanoy
(74) *Attorney, Agent, or Firm* — Sheridan Ross P.C.

(57) ABSTRACT

The present disclosure is directed to the introduction of an additive to a contaminated gas stream. An additive introduction system uses a compressor and carbon dioxide separator to provide a treated carrier gas for introduction of an alkaline additive to a contaminated gas stream.

21 Claims, 15 Drawing Sheets

(56) References Cited

U.S. PATENT DOCUMENTS

| | | |
|---|---|---|
| 3,838,190 A | 9/1974 | Birke et al. |
| 3,849,267 A | 11/1974 | Hilgen et al. |
| 3,849,537 A | 11/1974 | Allgulin |
| 3,896,746 A | 7/1975 | Pirsh |
| 3,907,674 A | 9/1975 | Roberts et al. |
| 3,932,494 A | 1/1976 | Yoshida et al. |
| 3,947,354 A | 3/1976 | Swanson et al. |
| 3,956,458 A | 5/1976 | Anderson |
| 3,961,020 A | 6/1976 | Seki |
| 3,970,434 A | 7/1976 | Gasior et al. |
| 3,974,254 A | 8/1976 | de la Cuadra Herra et al. |
| 4,040,802 A | 8/1977 | Deitz et al. |
| 4,042,664 A | 8/1977 | Cardwell et al. |
| 4,051,316 A | 9/1977 | Wing et al. |
| 4,057,398 A | 11/1977 | Bennett |
| 4,075,282 A | 2/1978 | Storp et al. |
| 4,083,783 A | 4/1978 | Wing et al. |
| 4,089,507 A | 5/1978 | Arai et al. |
| 4,094,777 A | 6/1978 | Sugier et al. |
| 4,101,631 A | 7/1978 | Ambrosini et al. |
| 4,115,518 A | 9/1978 | Delmon et al. |
| 4,148,613 A | 4/1979 | Myers |
| 4,173,454 A | 11/1979 | Heins |
| 4,174,373 A | 11/1979 | Yoshida et al. |
| 4,196,173 A | 4/1980 | DeJong et al. |
| 4,226,601 A | 10/1980 | Smith |
| 4,230,460 A | 10/1980 | Maust, Jr. |
| 4,233,274 A | 11/1980 | Allgulin |
| 4,238,329 A | 12/1980 | Zievers |
| 4,272,250 A | 6/1981 | Burk, Jr. et al. |
| 4,276,431 A | 6/1981 | Schnegg et al. |
| 4,280,817 A | 7/1981 | Chauhan et al. |
| 4,305,726 A | 12/1981 | Brown, Jr. |
| 4,308,241 A | 12/1981 | deVries |
| 4,308,242 A | 12/1981 | Horton |
| 4,322,218 A | 3/1982 | Nozaki |
| 4,364,818 A | 12/1982 | Schmid et al. |
| 4,372,227 A | 2/1983 | Mahoney et al. |
| 4,377,118 A | 3/1983 | Sadowski |
| 4,377,599 A | 3/1983 | Willard, Sr. |
| 4,385,891 A | 5/1983 | Ligotti |
| 4,387,653 A | 6/1983 | Voss |
| 4,394,354 A | 7/1983 | Joyce |
| 4,420,892 A | 12/1983 | Braun et al. |
| 4,427,630 A | 1/1984 | Aibe et al. |
| 4,438,709 A | 3/1984 | Borio et al. |
| 4,440,100 A | 4/1984 | Michelfelder et al. |
| 4,472,278 A | 9/1984 | Suzuki |
| 4,474,896 A | 10/1984 | Chao |
| 4,498,402 A | 2/1985 | Kober et al. |
| 4,500,327 A | 2/1985 | Nishino et al. |
| 4,514,256 A | 4/1985 | Kober et al. |
| 4,519,807 A | 5/1985 | Nishino et al. |
| 4,519,995 A | 5/1985 | Schrofelbauer et al. |
| 4,527,746 A | 7/1985 | Molls et al. |
| 4,552,076 A | 11/1985 | McCartney |
| 4,555,392 A | 11/1985 | Steinberg |
| 4,564,374 A | 1/1986 | Hofmann |
| 4,572,085 A | 2/1986 | Hepworth |
| 4,577,566 A | 3/1986 | Merrell |
| 4,578,256 A | 3/1986 | Nishino et al. |
| 4,582,936 A | 4/1986 | Ashina et al. |
| 4,586,443 A | 5/1986 | Burge et al. |
| 4,598,652 A | 7/1986 | Hepworth |
| 4,602,918 A | 7/1986 | Steinberg et al. |
| 4,629,721 A | 12/1986 | Ueno |
| 4,668,429 A | 5/1987 | Najjar |
| 4,671,804 A | 6/1987 | Najjar |
| 4,693,731 A | 9/1987 | Tarakad et al. |
| 4,706,579 A | 11/1987 | Merrell |
| 4,708,853 A | 11/1987 | Matviya et al. |
| 4,716,137 A | 12/1987 | Lewis |
| 4,729,882 A | 3/1988 | Ide et al. |
| 4,741,278 A | 5/1988 | Franke et al. |
| 4,753,632 A | 6/1988 | Hofmann et al. |
| 4,758,418 A | 7/1988 | Yoo et al. |
| 4,764,219 A | 8/1988 | Yan |
| 4,765,258 A | 8/1988 | Zauderer |
| 4,784,670 A | 11/1988 | Najjar |
| 4,786,483 A | 11/1988 | Audeh |
| 4,796,548 A | 1/1989 | Merrell et al. |
| 4,804,521 A | 2/1989 | Rochelle et al. |
| 4,807,542 A | 2/1989 | Dykema |
| 4,824,441 A | 4/1989 | Kindig |
| 4,830,829 A | 5/1989 | Craig, Jr. |
| 4,831,942 A | 5/1989 | Morimoto et al. |
| 4,843,980 A | 7/1989 | Markham et al. |
| 4,873,930 A | 10/1989 | Egense et al. |
| 4,886,519 A | 12/1989 | Hayes et al. |
| 4,886,521 A | 12/1989 | Khan |
| 4,889,698 A | 12/1989 | Moller et al. |
| 4,892,567 A | 1/1990 | Yan |
| 4,915,818 A | 4/1990 | Yan |
| 4,917,862 A | 4/1990 | Kraw et al. |
| 4,919,826 A | 4/1990 | Alzner |
| 4,933,158 A | 6/1990 | Aritsuka et al. |
| 4,936,047 A | 6/1990 | Feldmann et al. |
| 4,940,010 A | 7/1990 | Kubin et al. |
| 4,964,889 A | 10/1990 | Chao |
| 5,001,994 A | 3/1991 | Morimoto et al. |
| 5,013,358 A | 5/1991 | Ball et al. |
| 5,017,135 A | 5/1991 | Meyer |
| 5,022,329 A | 6/1991 | Rackley et al. |
| 5,024,171 A | 6/1991 | Krigmont et al. |
| 5,046,265 A | 9/1991 | Kalb |
| 5,049,163 A | 9/1991 | Huang et al. |
| 5,052,312 A | 10/1991 | Rackley et al. |
| 5,114,578 A | 5/1992 | Sundström |
| 5,116,793 A | 5/1992 | Chao et al. |
| 5,124,135 A | 6/1992 | Girrbach et al. |
| 5,126,300 A | 6/1992 | Pinnavaia et al. |
| 5,137,854 A | 8/1992 | Segawa et al. |
| 5,141,724 A | 8/1992 | Audeh et al. |
| 5,162,598 A | 11/1992 | Hutchings et al. |
| 5,179,058 A | 1/1993 | Knoblauch et al. |
| 5,190,566 A | 3/1993 | Sparks et al. |
| 5,196,648 A | 3/1993 | Jones |
| 5,202,301 A | 4/1993 | McNamara |
| 5,207,164 A | 5/1993 | Breen et al. |
| 5,209,062 A | 5/1993 | Vollenweider |
| 5,238,488 A | 8/1993 | Wilhelm |
| 5,282,430 A | 2/1994 | Nehls, Jr. |
| 5,288,306 A | 2/1994 | Aibe et al. |
| 5,307,743 A | 5/1994 | Jones |
| 5,313,915 A | 5/1994 | McDowell et al. |
| 5,320,051 A | 6/1994 | Nehls, Jr. |
| 5,320,817 A | 6/1994 | Hardwick et al. |
| 5,324,336 A | 6/1994 | Child |
| 5,328,673 A | 7/1994 | Kaczur et al. |
| 5,333,558 A | 8/1994 | Lees, Jr. |
| 5,336,835 A | 8/1994 | McNamara |
| 5,342,592 A | 8/1994 | Peter-Hoblyn et al. |
| 5,346,674 A | 9/1994 | Weinwurm et al. |
| 5,350,728 A | 9/1994 | Cameron et al. |
| 5,352,647 A | 10/1994 | Suchenwirth |
| 5,354,363 A | 10/1994 | Brown, Jr. et al. |
| 5,357,002 A | 10/1994 | Lezzi et al. |
| 5,364,421 A | 11/1994 | Westby et al. |
| 5,368,617 A | 11/1994 | Kindig |
| 5,372,619 A | 12/1994 | Greinke et al. |
| 5,379,902 A | 1/1995 | Wen et al. |
| 5,403,548 A | 4/1995 | Aibe et al. |
| 5,409,522 A | 4/1995 | Durham et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,505,746 A | 4/1996 | Chriswell et al. |
| 5,505,766 A | 4/1996 | Chang |
| 5,569,436 A | 10/1996 | Lerner |
| 5,571,490 A | 11/1996 | Bronicki et al. |
| 5,575,982 A | 11/1996 | Reiss et al. |
| 5,577,910 A | 11/1996 | Holland |
| 5,587,003 A | 12/1996 | Bulow et al. |
| 5,607,496 A | 3/1997 | Brooks |

(56) References Cited

U.S. PATENT DOCUMENTS

| | | |
|---|---|---|
| 5,613,851 A | 3/1997 | Trawöger et al. |
| 5,618,508 A | 4/1997 | Suchenwirth et al. |
| 5,635,150 A | 6/1997 | Coughlin |
| 5,658,487 A | 8/1997 | Carey et al. |
| 5,659,100 A | 8/1997 | Lin |
| 5,670,122 A | 9/1997 | Zamansky et al. |
| 5,672,323 A | 9/1997 | Bhat et al. |
| 5,678,959 A | 10/1997 | Griffard et al. |
| 5,679,259 A | 10/1997 | Bolser |
| 5,695,726 A | 12/1997 | Lerner |
| 5,733,360 A | 3/1998 | Feldman et al. |
| 5,733,516 A | 3/1998 | DeBerry |
| 5,738,834 A | 4/1998 | DeBerry |
| 5,741,397 A | 4/1998 | Kraver |
| 5,785,932 A | 7/1998 | Helfritch |
| 5,787,823 A | 8/1998 | Knowles |
| 5,795,159 A | 8/1998 | Ralls et al. |
| 5,797,742 A | 8/1998 | Fraker |
| 5,809,911 A | 9/1998 | Feizollahi |
| 5,810,910 A | 9/1998 | Ludwig et al. |
| 5,819,672 A | 10/1998 | Radway et al. |
| 5,827,352 A | 10/1998 | Altman et al. |
| 5,855,649 A | 1/1999 | Durham et al. |
| 5,871,703 A | 2/1999 | Alix et al. |
| 5,885,076 A | 3/1999 | Ralls et al. |
| 5,888,256 A | 3/1999 | Morrison |
| 5,893,943 A | 4/1999 | Durham et al. |
| 5,894,806 A | 4/1999 | Smyrniotis et al. |
| 5,897,688 A | 4/1999 | Voogt et al. |
| 5,899,678 A | 5/1999 | Thomson et al. |
| 5,900,042 A | 5/1999 | Mendelsohn et al. |
| 5,910,292 A | 6/1999 | Alvarez, Jr. et al. |
| 5,972,066 A | 10/1999 | Lehtinen |
| 5,989,506 A | 11/1999 | Markovs |
| 6,022,216 A | 2/2000 | Cattani |
| 6,024,931 A | 2/2000 | Hanulik |
| 6,027,551 A | 2/2000 | Hwang et al. |
| 6,027,552 A | 2/2000 | Ruck et al. |
| 6,083,289 A | 7/2000 | Ono et al. |
| 6,083,306 A | 7/2000 | Cattani |
| 6,117,403 A | 9/2000 | Alix et al. |
| 6,132,692 A | 10/2000 | Alix et al. |
| 6,136,281 A | 10/2000 | Meischen et al. |
| 6,136,749 A | 10/2000 | Gadkaree |
| 6,139,751 A | 10/2000 | Bogaert et al. |
| 6,165,366 A | 12/2000 | Sarangapani |
| 6,200,543 B1 | 3/2001 | Allebach et al. |
| 6,206,685 B1 | 3/2001 | Zamansky et al. |
| 6,221,001 B1 | 4/2001 | Comer et al. |
| 6,240,859 B1 | 6/2001 | Jones, Jr. |
| 6,248,217 B1 | 6/2001 | Biswas et al. |
| 6,250,235 B1 | 6/2001 | Oehr et al. |
| 6,258,334 B1 | 7/2001 | Gadkaree et al. |
| 6,258,456 B1 | 7/2001 | Meyer |
| 6,267,802 B1 | 7/2001 | Baldrey et al. |
| 6,284,199 B1 | 9/2001 | Downs et al. |
| 6,284,208 B1 | 9/2001 | Thomassen |
| 6,328,939 B1 | 12/2001 | Amrhein |
| 6,368,511 B1 | 4/2002 | Weissenberg et al. |
| 6,372,187 B1 | 4/2002 | Madden et al. |
| 6,375,909 B1 | 4/2002 | Dangtran et al. |
| 6,401,449 B1 | 6/2002 | Hofmann et al. |
| 6,447,740 B1 | 9/2002 | Caldwell et al. |
| 6,471,506 B1 | 10/2002 | Zamansky et al. |
| 6,475,451 B1 | 11/2002 | Leppin et al. |
| 6,475,461 B1 | 11/2002 | Ohsaki et al. |
| 6,484,651 B1 | 11/2002 | Shepard, Jr. et al. |
| 6,514,907 B2 | 2/2003 | Tsutsumi et al. |
| 6,521,021 B1 | 2/2003 | Pennline et al. |
| 6,524,371 B2 | 2/2003 | El-Shoubary et al. |
| 6,528,030 B2 | 3/2003 | Madden et al. |
| 6,533,842 B1 | 3/2003 | Maes et al. |
| 6,547,874 B2 | 4/2003 | Eck et al. |
| 6,558,454 B1 | 5/2003 | Chang et al. |
| 6,582,497 B1 | 6/2003 | Maes et al. |
| 6,589,318 B2 | 7/2003 | El-Shoubary et al. |
| 6,595,848 B1 | 7/2003 | Robinson |
| 6,610,263 B2 | 8/2003 | Pahlman et al. |
| 6,613,110 B2 | 9/2003 | Sanyal |
| 6,638,347 B2 | 10/2003 | El-Shoubary et al. |
| 6,638,485 B1 | 10/2003 | Iida et al. |
| 6,649,082 B2 | 11/2003 | Hayasaka et al. |
| 6,719,828 B1 | 4/2004 | Lovell et al. |
| 6,726,888 B2 | 4/2004 | Lanier et al. |
| 6,729,248 B2 | 5/2004 | Johnson et al. |
| 6,732,055 B2 | 5/2004 | Bagepalli et al. |
| 6,737,031 B2 | 5/2004 | Beal et al. |
| 6,773,471 B2 | 8/2004 | Johnson et al. |
| 6,787,742 B2 | 9/2004 | Kansa et al. |
| 6,790,420 B2 | 9/2004 | Breen et al. |
| 6,790,429 B2 | 9/2004 | Ciampi |
| 6,808,692 B2 | 10/2004 | Oehr |
| 6,827,837 B2 | 12/2004 | Minter |
| 6,841,513 B2 | 1/2005 | El-Shoubary et al. |
| 6,848,374 B2 | 2/2005 | Srinivasachar et al. |
| 6,864,008 B2 | 3/2005 | Otawa et al. |
| 6,878,358 B2 | 4/2005 | Vosteen et al. |
| 6,916,762 B2 | 7/2005 | Shibuya et al. |
| 6,939,523 B2 | 9/2005 | D'Alesandro |
| 6,942,840 B1 | 9/2005 | Broderick |
| 6,945,925 B2 | 9/2005 | Pooler et al. |
| 6,953,494 B2 | 10/2005 | Nelson, Jr. |
| 6,960,329 B2 | 11/2005 | Sellakumar |
| 6,962,617 B2 | 11/2005 | Simpson |
| 6,969,494 B2 | 11/2005 | Herbst |
| 6,972,120 B2 | 12/2005 | Holste et al. |
| 6,974,562 B2 | 12/2005 | Ciampi et al. |
| 6,974,564 B2 | 12/2005 | Biermann |
| 6,975,975 B2 | 12/2005 | Fasca |
| 7,118,720 B1 | 10/2006 | Mendelsohn et al. |
| 7,141,091 B2 | 11/2006 | Chang |
| 7,151,199 B2 | 12/2006 | Martens et al. |
| 7,153,481 B2 | 12/2006 | Bengtsson et al. |
| 7,156,959 B2 | 1/2007 | Herbst |
| 7,250,387 B2 | 7/2007 | Durante et al. |
| 7,312,300 B2 | 12/2007 | Mitchell |
| 7,331,533 B2 | 2/2008 | Bayer et al. |
| 7,332,002 B2 | 2/2008 | Johnson et al. |
| 7,361,209 B1 | 4/2008 | Durham et al. |
| 7,381,380 B2 | 6/2008 | Herbst |
| 7,381,387 B2 | 6/2008 | Lissianski et al. |
| 7,384,615 B2 | 6/2008 | Boardman et al. |
| 7,387,719 B2 | 6/2008 | Carson et al. |
| 7,413,719 B2 | 8/2008 | Digdon |
| 7,416,137 B2 | 8/2008 | Hagen et al. |
| 7,435,286 B2 | 10/2008 | Olson et al. |
| 7,452,392 B2 | 11/2008 | Nick et al. |
| 7,473,303 B1 | 1/2009 | Higgins et al. |
| 7,476,324 B2 | 1/2009 | Ciampi et al. |
| 7,479,215 B2 | 1/2009 | Carson et al. |
| 7,479,263 B2 | 1/2009 | Chang et al. |
| 7,494,632 B1 | 2/2009 | Klunder |
| 7,507,083 B2 | 3/2009 | Comrie |
| 7,514,052 B2 | 4/2009 | Lissianski et al. |
| 7,517,445 B2 | 4/2009 | Carson et al. |
| 7,517,511 B2 | 4/2009 | Schofield |
| 7,524,473 B2 | 4/2009 | Lindau |
| 7,531,708 B2 | 5/2009 | Carson et al. |
| 8,124,036 B1 | 2/2012 | Baldrey et al. |
| 2002/0068030 A1 | 6/2002 | Nolan et al. |
| 2002/0114749 A1 | 8/2002 | Cole |
| 2002/0121482 A1 | 9/2002 | Ciampi et al. |
| 2003/0065236 A1 | 4/2003 | Vosteen et al. |
| 2003/0079411 A1 | 5/2003 | Kansa et al. |
| 2003/0164309 A1 | 9/2003 | Nakamura et al. |
| 2003/0166988 A1 | 9/2003 | Hazen et al. |
| 2003/0206843 A1 | 11/2003 | Nelson, Jr. |
| 2004/0013589 A1 | 1/2004 | Vosteen et al. |
| 2004/0016377 A1 | 1/2004 | Johnson et al. |
| 2004/0129607 A1 | 7/2004 | Slater et al. |
| 2004/0256247 A1 | 12/2004 | Carson et al. |
| 2005/0020828 A1 | 1/2005 | Therkelsen |
| 2005/0026008 A1 | 2/2005 | Heaton et al. |
| 2005/0039598 A1 | 2/2005 | Srinivasachar et al. |

(56) References Cited

U.S. PATENT DOCUMENTS

| | | |
|---|---|---|
| 2005/0056548 A1 | 3/2005 | Minter |
| 2005/0090379 A1 | 4/2005 | Shibuya et al. |
| 2005/0132880 A1 | 6/2005 | Chang |
| 2006/0027488 A1 | 2/2006 | Gauthier |
| 2006/0029531 A1 | 2/2006 | Breen et al. |
| 2006/0051270 A1 | 3/2006 | Brunette |
| 2006/0124444 A1 | 6/2006 | Nakamura et al. |
| 2006/0185226 A1 | 8/2006 | McDonald et al. |
| 2006/0204418 A1 | 9/2006 | Chao et al. |
| 2006/0205592 A1 | 9/2006 | Chao et al. |
| 2007/0051239 A1 | 3/2007 | Holmes et al. |
| 2007/0156288 A1 | 7/2007 | Wroblewski et al. |
| 2007/0167309 A1 | 7/2007 | Olson |
| 2007/0179056 A1 | 8/2007 | Baek et al. |
| 2007/0180990 A1 | 8/2007 | Downs et al. |
| 2007/0184394 A1 | 8/2007 | Comrie |
| 2008/0060519 A1 | 3/2008 | Maly et al. |
| 2008/0069749 A1 | 3/2008 | Liu et al. |
| 2008/0107579 A1 | 5/2008 | Downs et al. |
| 2008/0115704 A1 | 5/2008 | Berry et al. |
| 2008/0121142 A1 | 5/2008 | Comrie |
| 2009/0007785 A1 | 1/2009 | Kimura et al. |
| 2009/0031929 A1 | 2/2009 | Boardman et al. |
| 2009/0047199 A1 | 2/2009 | Arrol et al. |
| 2009/0081092 A1 | 3/2009 | Yang et al. |
| 2009/0104097 A1 | 4/2009 | Dunson, Jr. |
| 2009/0117019 A1 | 5/2009 | Comrie |
| 2009/0136401 A1 | 5/2009 | Yang et al. |
| 2010/0068111 A1 | 3/2010 | Walsh, Jr. |
| 2010/0221166 A1 | 9/2010 | Muggli |
| 2011/0030592 A1 | 2/2011 | Baldrey et al. |
| 2011/0195003 A1 | 8/2011 | Durham et al. |
| 2011/0206586 A1* | 8/2011 | Mooney .................. 423/230 |
| 2011/0262327 A1 | 10/2011 | Dillon et al. |
| 2013/0139683 A1 | 6/2013 | Hanson et al. |
| 2014/0030178 A1 | 1/2014 | Martin |

FOREIGN PATENT DOCUMENTS

| | | |
|---|---|---|
| CA | 2150529 | 12/1995 |
| CA | 2418578 | 8/2003 |
| CA | 2435474 | 1/2004 |
| CN | 1052838 | 7/1991 |
| DE | 2548845 | 5/1976 |
| DE | 2713197 | 10/1978 |
| DE | 2917273 | 11/1980 |
| DE | 3615759 | 11/1987 |
| DE | 3628963 | 3/1988 |
| DE | 3711503 | 10/1988 |
| DE | 3918292 | 4/1990 |
| DE | 4218672 | 8/1993 |
| DE | 4308388 | 10/1993 |
| DE | 4422661 | 1/1996 |
| DE | 19520127 | 12/1996 |
| DE | 19850054 | 5/2000 |
| DE | 10233173 | 7/2002 |
| DE | 10131464 | 1/2003 |
| DE | 60019603 | 4/2006 |
| DK | 409279 | 3/1980 |
| EP | 0009699 | 4/1980 |
| EP | 0115634 | 8/1984 |
| EP | 0208036 | 1/1987 |
| EP | 0220075 | 4/1987 |
| EP | 0254697 | 1/1988 |
| EP | 0433674 | 11/1990 |
| EP | 0433677 | 6/1991 |
| EP | 0435848 | 7/1991 |
| EP | 0628341 | 12/1994 |
| EP | 0666098 | 8/1995 |
| EP | 0709128 | 5/1996 |
| EP | 0794240 | 9/1997 |
| EP | 0908217 | 4/1999 |
| EP | 1213046 | 10/2001 |
| EP | 1199354 | 4/2002 |
| EP | 1271053 | 1/2003 |
| EP | 1386655 | 2/2004 |
| EP | 1570894 | 9/2005 |
| FR | 1394547 | 4/1965 |
| FR | 1394847 | 4/1965 |
| GB | 1121845 | 7/1968 |
| HU | 0202095 | 6/2004 |
| JP | 11-94234 | 6/1905 |
| JP | 49-53590 | 5/1974 |
| JP | 49-53591 | 5/1974 |
| JP | 49-53592 | 5/1974 |
| JP | 49-53593 | 5/1974 |
| JP | 49-53594 | 5/1974 |
| JP | 49-66592 | 6/1974 |
| JP | 51-5586 | 1/1976 |
| JP | 59-10343 | 1/1984 |
| JP | 59-76537 | 5/1984 |
| JP | 59-160534 | 9/1984 |
| JP | 63-100918 | 5/1988 |
| JP | 09-239265 | 9/1997 |
| JP | 09-239265 A * | 9/1997 | ............... B01J 20/20 |
| JP | 10-109016 | 4/1998 |
| JP | 2000-197811 | 7/2000 |
| JP | 2000-205525 | 7/2000 |
| JP | 2000-515586 | 11/2000 |
| JP | 2001-347131 | 12/2001 |
| JP | 2002-355031 | 12/2002 |
| JP | 2003-065522 | 3/2003 |
| JP | 2004-066229 | 3/2004 |
| JP | 2005-230810 | 9/2005 |
| KR | 2004-0010276 | 1/2004 |
| PL | 0354795 | 12/2002 |
| WO | WO 86/04602 | 8/1986 |
| WO | WO 91/09977 | 7/1991 |
| WO | WO 96/30318 | 10/1996 |
| WO | WO 97/17480 | 5/1997 |
| WO | WO 98/15357 | 4/1998 |
| WO | WO 99/58228 | 11/1999 |
| WO | WO 01/28787 | 4/2001 |
| WO | WO 01/38787 | 5/2001 |
| WO | WO 03/093518 | 11/2003 |
| WO | WO 2005/092477 | 10/2005 |
| ZA | 2003-05568 | 7/2004 |

OTHER PUBLICATIONS

"Bromine" webpage, http://www2.gtz.de/uvp/publika/English/vol318.htm, printed Sep. 14, 2006, 4 pages.

"Burning PRB Coals ADA Environmental Offers Flyash Solutions," Western Coal Advisory, Summer/Autumn 1999, 1 page.

"Chlorine" webpage, http://www2.gtz.de/uvp/publika/English/vol324.htm, printed Sep. 14, 2006, 4 pages.

"Cyclone Furnaces," Chapter 10 of Steam/Its Generation and Use, Babcock & Wilcox, 1972, 38th Edition, pp. 10-1 to 10-8.

"DOE Announces Further Field Testing of Advanced Mercury Control Technologies, Six Projects Selected in Round 2 to Address Future Power Plant Mercury Reduction Initiatives," TECHNews From the National Energy Technology Laboratory, Nov. 5, 2004, available at http://www.netl.doe.gov/publications/TechNews/tn_mercury-control.html, printed on Jun. 3, 2009, pp. 1-2.

"DrägerSenor CI2—68 08 865 Data Sheet," Dräger Product Information, Apr. 1997, pp. 1-6 (with English translation).

"Enhanced Mercury Control: KNX™ Coal Additive Technology," Alstom Power Inc., printed Aug. 3, 2006, 1 page.

"Evaluation of Sorbent Injection for Mercury Control at Great River Energy Coal Creek Station," ADA Environmental Solutions, Nov. 16-20, 2003 Final Report, Electric Power Research Institute, issued Mar. 3, 2004, 32 pages.

"Fuel Ash Effects on Boiler Design and Operation," Chapter 21 of Steam/Its Generation and Use, Babcock & Wilcox Company, 2005, 41st Edition, pp. 21-1 to 21-27.

"Fuel-ash Effects on Boiler Design and Operation," Chapter 15 of Steam/Its Generation and Use, Babcock and Wilcox Company, 1972, 38th Edition, pp. 15-1 to 15-26.

"Gas Phase Filtration," Vaihtoilma White Air Oy, date unknown, 3 pages.

(56) References Cited

OTHER PUBLICATIONS

"Impregnated Activated Carbon," Products and Technologies Website, as early as 1999, available at http://www.calgoncarbon.com/product/impregnated.html, printed on Dec. 18, 1999, p. 1.
"Incineration: Taking the heat out of complex waste," Bayer Industry Services website, as early as 2005, available at http://web.archive.org/web/20060318115553/www.entsorgung.bayer.com/index.cfm?PAGE_ID=299, pp. 1-2, printed on Jun. 4, 2009.
"Iron- and Steelmaking," date unknown, pp. 646-660.
"Protecting Human Health. Mercury Poisoning," US EPA Website, as early as Oct. 8, 1999, available at http://www.epa.gov/region02/health/mercury/, printed on Feb. 5, 2002, pp. 1-4.
"Texas Genco, EPRI, and URS Corporation Test Innovative Mercury Control Method at Limestone Station—Technology Aims to Capture More Mercury from Power Plant Exhaust," News Release, Jan. 11, 2005, available at http://amptest.epri.com/corporate/discover_epri/news/2005/011105_mercury.html, printed on Apr. 24, 2009, pp. 1-2.
Aldrich Chemical Catalog, Aldrich Chemical Co., Inc., 1996, pp. 863-866.
Anders et al., "Selenium in Coal-Fired Steam Plant Emissions," Environmental Science & Technology, 1975, vol. 9, No. 9, pp. 856-858.
Bansal et al., Active Carbon, Marcel Dekker, Inc., New York, 1989, pp. 1-3, 24-29, 391-394, 457.
Benson et al., "Air Toxics Research Needs: Workshop Findings," Proceedings of the 1993 So2 Control Symposium, U.S. EPA, vol. 2, Session 6A, Aug. 24-27, 1993, pp. 1-17, Boston, MA.
Biswas et al., "Control of Toxic Metal Emissions from Combustors Using Sorbents: A Review," J. Air & Waste Manage. Assoc., Feb. 1998, vol. 48, pp. 113-127.
Biswas et al., "Introduction to the Air & Waste Management Association's 29th Annual Critical Review," Journal of the Air & Waste Management Association, Jun. 1999, pp. 1-2.
Bloom, "Mercury Speciation in Flue Gases: Overcoming the Analytical Difficulties," presented at EPRI Conference, Managing Hazardous Air Pollutants, State of the Arts, Washington D.C., Nov. 1991, pp. 148-160.
Brown et al., "Mercury Measurement and Its Control: What We Know, Have Learned, and Need to Further investigate," J. Air & Waste Manage. Assoc, pp. 1-97 (Jun. 1999).
Buschmann et al., "The KNX™ Coal Additive Technology a Simple Solution for Mercury Emissions Control," Alstom Power Environment, Dec. 2005, pp. 1-7.
Bustard et al., "Full-Scale Evaluation of Sorbent Injection for Mercury Control on Coal-Fired Power Plants" Air Quality III, ADA Environmental Solutions, LLC (Arlington, VA) (Sep. 12, 2002).
Calgon Carbon product and bulletin webpages, 11 pages (undated).
Carey et al., "Factors Affecting Mercury Control in Utility Flue Gas Using Activated Carbon," J. Air & Waste Manage. Assoc., Dec. 1998, vol. 48, pp. 1166-1174.
De Vito et al., "Sampling and Analysis of Mercury in Combustion Flue Gas," Presented at the Second International Conference on Managing Hazardous Air Pollutants, Washington, DC, Jul. 13-15, 1993, pp. VII39-VII-65.
Declaration of Richard Schlager; Sep. 18, 2002.
Donnet et al., eds., Carbon Black: Science and Technology, 2nd Edition, Marcel Dekker, New York, 1993, pp. 182-187, 218-219.
Dunham et al., "Investigation of Sorbent Injection for Mercury Control in Coal-Fired Boilers," Energy & Environmental Research Center, University of North Dakota (Sep. 10, 1998).
Durham et al., "Full-Scale Evaluation of Mercury Control by Injecting Activated Carbon Upstream of ESPS," Air Quality IV Conference, ADA Environmental Solutions (Littleton, Colorado) (Feb. 10, 2003).
Edwards et al., "A Study of Gas-Phase Mercury Speciation Using Detailed Chemical Kinetics," in Journal of the Air and Waste Management Association, vol. 51, Jun. 2001, pp. 869-877.
Fabian et al., "How Bayer incinerates wastes," Hydrocarbon Processing, Apr. 1979, pp. 183-192.

Felsvang et al., "Activated Carbon Injection in Spray Dryer/ESP/FF for Mercury and Toxics Control" (Feb. 10, 1993).
Felsvang, K. et al., "Air Toxics Control by Spray Dryer," Presented at the 1993 SO2 Control Symposium, Boston, MA, Aug. 24-27, 1993, 16 pages.
Felsvang, K. et al., "Control of Air Toxics by Dry FGDSystems," Power-Gen '92 Conference, 5th International Conference & Exhibition for the Power Generating Industries, Orlando, FL, Nov. 17-19, 1992, pp. 189-208.
Galbreath et al., "Mercury Transformations in Coal Combustion Flue Gas," Fuel Processing Technology, 1999, vol. 65-66, pp. 291-292.
Gale et al., "Mercury Speciation as a Function of Flue Gas Chlorine Content and Composition in a 1 MW Semi-Industrial Scale Coal-Fired Facility," In Proceedings of the Mega Symposium and Air & Waste Management Association's Specialty Conference, Washington, DC, May 19-22, 2003, Paper 28, 19 pages.
Gale, "Mercury Adsorption and Oxidation Kinetics in Coal-Fired Flue Gas," Proceedings of the 30th International Technical Conference on Coal Utilization & Fuel Systems, 2005, pp. 979-990.
Gale, "Mercury Control with Calcium-Based Sorbents and Oxidizing Agents," Final Report of Southern Research Institute, Jul. 2005, 137 pages.
Gale, "Mercury Control with Calcium-Based Sorbents and Oxidizing Agents," Southern Research Institute, Mercury Control Technology R&D Program Review Meeting, Aug. 12-13, 2003, 25 pages.
Geiger et al, "Einfluβ des Schwefels auf Die Doxin—and Furanbuilding bei der Klärschlammverbrennung," VGB Kraftwerkstechnik, 1992, vol. 72, pp. 159-165.
Ghorishi et al., "Effects of Fly Ash Transition Metal Content and Flue Gas HCI/SO2 Ratio on Mercury Speciation in Waste Combustion," In Environmental Engineering Science, Nov. 2005, vol. 22, No. 2, pp. 221-231.
Ghorishi et al., "In-Flight Capture of Elemental Mercury by a Chlorine-Impregnated Activated Carbon," presented at the Air & Waste Management Association's 94h Annual Meeting & Exhibition, Orlando, FL, Jun. 2001, pp. 1-14.
Granite et al., "Novel Sorbents for Mercury Removal from Flue Gas," National Energy Technology Laboratory (Apr. 10, 2000).
Griffin, "A New Theory of Dioxin Formation in Municipal Solid Waste Combustion," Chemosphere, 1986, vol. 15, Nos. 9-12, pp. 1987-1990.
Gullet, B.K. et al, "The Effect of Sorbent Injection Technologies on Emissions of Coal-Based, Based, Metallic Air Toxics," Proceedings of the 1993 S02 Control Symposium, vol. 2, U.S. EPA (Research Triangle Park, NC) Session 6A, Boston, MA, Aug. 24-27,1993, 26 pages.
Gullett, B. et al., "Bench-Scale Sorption and Desorption of Mercury with Activated Carbon," Presented at the 1993 International Conference on Municipal Waste Combustion, Williamsburg, VA, Mar. 30-Apr. 2, 1993, pp. 903-917.
Gullett, B. et al., "Removal of Illinois Coal-Based Volatile Tracy Mercury," Final Technical Report, Sep. 1, 1996 through Aug. 31,1997.
Guminski, "The Br-Hg (Bromine-Mercury) System," Journal of Phase Equilibria, Dec. 2000, vol. 21, No. 6, pp. 539-543.
Hall et al., "Chemical Reactions of Mercury in Combustion Flue Gases," Water, Air, and Soil Pollution 56:3-14,1991.
Hein, K.R.G. et al., Research Report entitled, "Behavior of Mercury Emission from Coal Sewage Sludge Co-combustion Taking into Account the Gaseous Species," Förderkennzeichen: PEF 398002, Apr. 2001 (English Abstract).
Henning et al., "Impregnated activated carbon for environmental protection," Gas Separation & Purification, Butterworth-Heinemann Ltd., vol. 7, No. 4 (Feb. 9, 1993).
Ismo et al., "Formation of Aromatic Chlorinated Compounds Catalyzed by Copper and Iron," Chemosphere vol. 34, No. 12, pp. 2649-2662 (1997).
Jozewicz et al., "Bench-Scale Scale Investigation of Mechanisms of Elemental Mercury Capture by Activated Carbon," Presented at the Second International Conference on Managing Hazardous Air Pollutants, Washington, D.C., Jul. 13-15, 1993, pp. VII-85 through VII-99.

(56) References Cited

OTHER PUBLICATIONS

Kellie et al., "The Role of Coal Properties on Chemical and Physical Transformation on Mercury in Post Combustion," presented at Air Quality IV Conference, Arlington, VA, Sep. 2003, pp. 1-14.

Kilgroe et al., "Fundamental Science and Engineering of Mercury Control in Coal-Fired Power Plants," presented at Air Quality IV Conference, Arlington, VA, Sep. 2003.

Kobayashi, "Japan EnviroChemicals, Ltd. Overview," Feb. 3, 2002, 3 pages.

Kramlich, "The Homogeneous Forcing of Mercury Oxidation to Provide Low-Cost Capture," Abstract, University of Washington, Department of Mechanical Engineering, Mar. 25, 2004, available at http://www.netl.doe.gov/publications/proceedings/04/UCR-HBCU/abstracts/Kramlich.pdf, pp. 1-2.

Krishnan et al., "Mercury Control by Injection of Activated Carbon and Calcium-Based Based Sorbents," Solid Waste Management: Thermal Treatment and Waste-to-Energy Technologies, U.S. EPA and AWMA, Washington, DC, Apr. 18-21, 1995, pp. 493-504.

Krishnan et al., "Mercury Control in Municipal Waste Combustors and Coal Fired Utilities," Environmental Progress, ProQuest Science Journals, Spring 1997, vol. 16, No. 1, pp. 47-53.

Krishnan et al., "Sorption of Elemental Mercury by Activated Carbons," Environmental Science and Technology, 1994, vol. 28, No. 8, pp. 1506-1512.

Lee et al., "Mercury Control Research: Effects of Fly Ash and Flue Gas Parameters on Mercury Speciation," U.S. Environmental Protection Agency National Risk Management Research Laboratory and ARCADIS, as early as 1998, Geraghy & Miller, Inc., pp. 221-238, Research Triangle Park, NC.

Lemieux et al., "Interactions Between Bromine and Chlorine in a Pilot-Scale Hazardous Waste Incinerator," paper presented at 1996 International Incineration Conference, Savannah, GA, May 6-10, 1996.

Linak et al., "Toxic Metal Emissions from Incineration: Mechanisms and Control" Progress in Energy & Combustion Science, 1993, vol. 19, pp. 145-185.

Lissianski et al., "Effect of Coal Blending on Mercury Removal," presented at the Low Rank Fuels Conference, Billings, MT, Jun. 24-26, 2003, pp. 1-9.

Livengood et al,, "Enhanced Control of Mercury Emissions Through Modified Speciation," for Presentation at the Air & Waste Management Association's 90th Meeting & Exhibition, Jun. 8-13, 1997, 14 pages.

Livengood et al., "Development of Mercury Control Techniques for Utility Boilers," for Presentation at the 88th Air & Waste Management Association Annual Meeting & Exhibit, Jun. 18-23, 1995, pp. 1-14.

Livengood et al., "Investigation of Modified Speciation for Enhanced Control of Mercury," Argonne National Laboratory, 1998, available at http://www.netl.doe.gov/publications/proceedings/97/97ps/ps_pdf/PS2B-9.pdf, pp. 1-15

Luijk et al., "The Role of Bromine in the De Novo Synthesis in a Model Fly Ash System," Chemosphere, 1994, vol. 28, No. 7, pp. 1299-1309.

Martel, K., "Brennstoff-und lastspezifische Untersuchungen zum Verhalten von Schwermetallen in Kohlenstaubfeuerungen [Fuel and load specific studies on the behavior of heavy metals in coal firing systems ]," Fortschritt-Berichte VDI, Apr. 2000, pp. 1-240.

McCoy et al., "Full-Scale Mercury Sorbent Injection Testing at DTE Energy's St. Clair Station," Paper #97, DTE Energy, as early as 2004, pp. 1-9.

Niessen, Combustion and Incineration Processes, 2002, Marcel Dekker, 3rd Edition, p. 25.

Niksa et al., "Predicting Mercury Speciation in Coal-Derived Flue Gases," presented at the 2003 Combined Power Plant Air Pollutant Control Mega Symposium, Washington, D.C., May 2003, pp. 1-14.

Nucon International, Inc., "Nusorb Mersorb Family of Adsorbents for Mercury Control," As early as Jan. 2002, 3 pages.

Oberacker et al., "Incinerating the Pesticide Ethylene Dibromide (EDB)—A field-Scale Trail Burn Evaluation of Environmental Performance," Report EPA /600/D-88/198, Oct. 1988, pp. 1-11.

Olson et al., "An Improved Model for Flue Gas-Mercury Interactions on Activated Carbons," presented at Mega Symposium May 21, 2003, Energy & Environmental Research Center publication, Paper # 142, pp. 1-8.

Olson et al., "Oxidation Kinetics and the Model for Mercury Capture on Carbon in Flue Gas," presented at Air Quality V Conference, Sep. 21, 2005, pp. 1-7.

Oppenheimer et al., "Thermische Entsorgung von Produktionsabfällen," Entsorgungs-Praxis, 2000, vol. 6, pp. 29-33.

Pavlish et al., "Status Review of Mercury Control Options for Coal-Fired Power Plants," Fuel Processing Technology, Aug. 2003, vol. 82, pp. 89-165.

"RBHG 4 Combats Mercury Pollution," Know-How, Norit, vol. 6(2), 2003, 3 pages.

Revised Declaration of Richard Schlager, Aug. 19, 2003.

Richardson et al., "Chemical Addition for Mercury Control in Flue Gas Derived from Western Coals," presented at the 2003 Combined Power Plant Air Pollutant Control Mega Symposium, Washington D.C., May 2003, Paper # 63, pp. 1-16.

Sage et al., "Relationship of Coal-Ash Viscosity to Chemical Composition," Journal of Engineering for Power, Apr. 1960, pp. 145-155.

Samaras et al., "PCDD/F Prevention by Novel Inhibitors: Addition of Inorganic S- and N-Compounds in the Fuel before Combustion," Environmental Science and Technology, 2000, vol. 34, No. 24, pp. 5092-5096.

Senior et al., "Gas-Phase Transformations of Mercury in Coal-Fired Power Plants," Fuel Processing Technology, vol. 63, 2000, pp. 197-213.

Senior, "Behavior of Mercury in Air Pollution Control Devices on Coal-Fired Utility Boilers," Power Production in the 21st Century: Impacts of Fuel Quality and Operations, Engineering Foundation Conference, Snowbird, UT (Oct. 28-Nov. 2, 2001).

Singer, J., ed., "Development of Marine Boilers," Combustion Fossil Power, Combustion Engineering, Inc., Windsor, CT, 1991, Ch. 3, pp. 10-4-10-14.

Sjostrom et al., "Full-Scale Evaluation of Mercury Control at Great River Energy's Stanton Generating Station Using Injected Sorbents and a Spray Dryer/Baghouse," Air Quality III Conference, Session A3b (Feb. 10, 2002).

Sjostrom et al., "Full-Scale Evaluation of Mercury Control by Injecting Activated Carbon Upstream of a Spray Dryer and Fabric Filter," Presented at the 2004 combined power plant air pollutant control mega symposium, Washington, D.C., Aug. 2004, 18 pages.

Sjostrom, "Evaluation of Sorbent Injection for Mercury Control," ADA-ES, Inc. Topical Report for Basin Electric Power Cooperative's Laramie River Station, Jan. 16, 2006, 49 pages.

Sjostrom, "Evaluation of Sorbent Injection for Mercury Control," Topical Report for Sunflower Electric's Holcomb Station, U.S. DOE Cooperative Agreement No. DE-FC26-03NT41986, Topical Report No. 41986R07, Jun. 2005, 85 pages.

SKC, "The Essential Reference for air sampling," 1997 Comprehensive Catalog & Air Sampling Guide (4 pages).

Sliger et al., "Towards the Development of a Chemical Kinetic Model for the Homogeneous Oxidation of Mercury by Chlorine Species," Fuel Processing Technology, vol. 65-66, 2000, pp. 423-438.

Speight, ed., The Chemistry and Technology of Coal, CRC Press, 1994, pp. 152-155.

Starns et al., "Full-Scale Evaluation of TOXECON II™ on a Lignite-Fired Boiler" presented at US EPA/DOE/EPRI Combiner Power Plant Air Pollutant Control Symposium: The Mega Symposium, Washington, DC (Aug. 30-Sep. 2 2004).

Sudhoff, "Anticipated Benefits of the TOXECON Retrofit for Mercury and Multi-Pollutant Control Technology," National Energy Technology Laboratory, Nov. 19, 2003, available at http://www.netl.doe.gov/technologies/coalpower/cctc/pubs/Benefits_TOXECON_111903.pdf, pp. 1-20.

Teller et al., "Mercury Removal from Incineration Flue Gas," Air and Water Technologies Co., for presentation at the 84th Annual Meeting & Exhibition Vancouver, British Columbia, Jun. 16-21, 1991.

(56) References Cited

OTHER PUBLICATIONS

United States Environmental Protection Agency, "Study of Hazardous Air Pollutant Emissions from Electric Tility Steam Generating Units," Report to Congress, vol. 1-2, EPA-453/R-98-004a&b, Feb. 1998, pp. 1-165.
United States Environmental Protection Agency, EPA-452/R-97-010, "Mercury Study Report to Congress vol. VIII- An Evaluation of Mercury Control Technologies and Costs," Dec. 1997.
Urabe et al., "Experimental Studies on Hg Vapour Removal Using Corona Discharge for Refuse Incinerator," Chemical Abstracts, Oct. 1997, vol. 109, 37 pages. (includes translation).
Urano, S., "Studies on Bleaching Powder, VII. The Decomposition of Calcium Hypochlorite by Heat in the Presence of Calcium Chloride," Journal of the Society of Chemical Industry of Japan, vol. 31, 1928, pp. 46-52 (no translation).
Verhulst et al., "Thermodynamic behaviour of metal chlorides and sulfates under the conditions of incineration furnaces," Environmental Science & Technology, 1996, vol. 30, No. 1, pp. 50-56.
Vidic et al., "Uptake of Elemental Mercury Vapors by Activated Carbons;," Journal of the Air & Waste Management Association, 1996, vol. 46, pp. 241-250.
Vidic et al., "Vapor-phase elemental mercury adsorption by activated carbon impregnated with chloride and cheltinq agents," Carbon, 2001, vol. 39, pp. 3-14.
Vosteen et al., "Bromine Enhanced Mercury Abatement from Combustion Flue Gases—Recent Industrial Applications and Laboratory Research," VGB PowerTech, International Journal for Electricity and Heat Generation, 2006, vol. 86, No. 3, pp. 70-75.
Vosteen, et al, "Mercury -Related Chemistry in Waste Incineration and Power Generation Flue Gases," Sep. 2003, Air Quality IV, pp. 1-8.
Wanke et al., "The influence of flame retarded plastic foams upon the formation of Br containing dibenzo-p-dioxins and dibenzofurans in a MSWI," Organohalogen Compounds, 1996, vol. 28, pp. 530-535.
"Speciality Impregnated Carbons," Waterlink/Barnebey Sutcliff, copyright 2000, 5 pages.
Weber et al., "The Role of Copper(II) Chloride in the Formation of Organic Chlorine in Fly Ash," Chemosphere, 2001, vol. 42, pp. 479-582.
White et al., "Field Test of Carbon Injection for Mercury Control at Camden County Municipal Waste Combustor," EPA-600/R-93-181 (NTIS PB94-101540), Sep. 1993, pp. 1-11.
Working project report for period Oct. 1, 1999 to Sep. 30, 2001 from Institut fur Verhrenstechnik and Dampfkesselwessen (IVD), Universitat Stuttgart, dated Mar. 28, 2002, pp. 14-38.
Zygarlicke et al., "Flue gas interactions of mercury, chlorine, and ash during coal combustion," Proceedings of the 23rd International Technical Conference on Coal Utilization and Fuel Systems, Clearwater, Florida, Mar. 9-13, 1998, pp. 517-526 (ISBN 0-03206602302).
International Search Report for International (PCT) Patent Application No. PCT/US11/27968, mailed May 5, 2011.
Written Opinion for International (PCT) Patent Application No. PCT/US11/27968, mailed May 5, 2011.
International Preliminary Report on Patentability for International (PCT) Patent Application No. PCT/US2011/027968, mailed Sep. 20, 2012 8 pages.
Official Action for U.S. Appl. No. 13/045,076, mailed Jun. 4, 2012 10 pages.
Notice of Allowance for U.S. Appl. No. 13/045,076, mailed Oct. 12, 2012 7 pages.
Background of the invention for the above captioned application (previously provided), Oct. 2012.
Mills Jr., "Techline: Meeting Mercury Standards," Jun. 18, 2001, available at http://www.netl.doe/publications/press/2001/tl_mercuryel2.html, printed on Feb. 5, 2002, pp. 1-3.
"Handling Hydrated Lime from a Lime Supplier's Perspective," Workshop 25, 2010 APC Round Table & Expo Presentation, Reinhold Enviromental Ltd., Jul. 18-20, 2010, 33 pages.
Steele "Dense-Phase Pneumatic Conveying Systems," Powder/Bulk solids, Jan. 2007, 5 pages.
Mills Jr., "Techline: Meeting Mercury Standards," Jun. 18, 2001, available at http://www.netl.doe/publications/press/2001/tl_mercuryel2.html, printed on Feb. 5, 2002, pp. 1-3.

* cited by examiner

AIR TREATMENT PROCESS FOR DILUTE PHASE INJECTION OF DRY ALKALINE MATERIALS

CROSS REFERENCE TO RELATED APPLICATION

The present application is (a) a continuation-in-part under 35 USC 120 of U.S. patent application Ser. No. 13/045,076, filed Mar. 10, 2011, now U.S. Pat. No. 8,383,071, with an issue date of Feb. 26, 2013, which claims the benefits of U.S. Provisional Application Ser. No. 61/415,480, filed Nov. 19, 2010, and Ser. No. 61/312,453, filed Mar. 10, 2010, and the present application also (b) claims the benefits of U.S. Provisional Application Ser. No. 61/542,972, filed Oct. 4, 2011, which are each incorporated herein by this reference in their entireties.

FIELD

The disclosure relates generally to controlling contaminant emissions and particularly to introducing additives to contaminant-containing gases.

BACKGROUND

Injection of hydrated lime and other alkaline materials is a promising technology for control of acid, such as $NO_X$ (NO and $NO_2$), HCl, and $SO_X$ ($SO_2$ and $SO_3$) from coal- and biomass-fired sources. Acid gas control is becoming obligatory due to the problems arising from increased corrosion, acid mist emissions and associated impacts to plant opacity, and the propensity of certain acid gases, such as $SO_3$, to interfere with powdered activated carbon ("PAC") used for mercury capture from these sources. Concerns with $SO_3$ emissions have increased due to selective catalytic reduction reactors ("SCRs") oxidizing sulfur dioxide to sulfur trioxide. SCRs are being installed on an increasing number of coal-fired sources for control of nitrogen oxides. $SO_x$ species are also present in flue gas at elevated levels when burning high sulfur coals. The presence of sulfur species and the ammonia reactants used for nitrogen oxide control can combine to form condensable compounds that foul or degrade air heater performance over time.

Injection of dry alkaline sorbents to control acid gas emissions continue to be used successfully at many coal-fired sources to chemically control emissions. When dry alkaline materials are injected into a gas stream for the purpose of controlling acid gases, the desired chemical reactions occur in the flue gas stream.

A major goal of any injection system is to maximize the desired reactions and minimize undesired reactions and/or interactions with the walls and mechanical systems downstream. As an example, one of the desired acid gas reactions between hydrated lime and $SO_3$ is shown below:

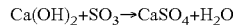

$$Ca(OH)_2 + SO_3 \rightarrow CaSO_4 + H_2O$$

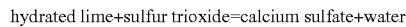

hydrated lime+sulfur trioxide=calcium sulfate+water

One of the major undesired reactions that occurs within the alkaline sorbent injection system is chemisorption of carbon dioxide by hydrated lime with carbon dioxide:

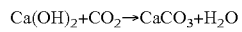

$$Ca(OH)_2 + CO_2 \rightarrow CaCO_3 + H_2O$$

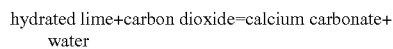

hydrated lime+carbon dioxide=calcium carbonate+water

The rate of carbonate formation is believed to be a temperature-dependent process; that is, the higher the gas temperature the greater the rate of conversion of hydrate to carbonate. Calcium carbonate has been shown to be inversely soluble, therefore increasing temperature leads to greater carbonate deposition within the injection system. Managing the temperature of the injection system and lime carrier gas reduces the rate of formation and subsequently minimizes the deposition of calcium carbonate as a precipitate or scale. Due to the presence of air in the injection system, $CO_2$ is always available for reaction in either the carrier gas or in the flue gas that contaminates the carrier gas through leakage or recirculation into the injection system. Therefore, thermal management of the injection system is employed to successfully moderate carbonate formation, reduce lime consumption, and increase system reliability.

A carrier gas treatment system 200 according to the prior art includes an optional dehumidifier 204 to reduce moisture levels (adsorption of moisture can result in caking, agglomeration and/or deposition of the sorbent within the feed, conveying, and injection components), a regenerative or positive displacement blower 208 (air having a pressure in the range of 3 to 25 psi), and a refrigerated air dryer 212 and/or after cooler 216. Other configurations and arrangements of the illustrated equipment are possible. This system 200 generally reduces the dew point of the conveying air to a temperature just above 32° F. Although the reaction of calcium hydroxide and carbon dioxide to air is slowed by the gas dehumidification and cooling, the degree of dehumidification and cooling is limited. Accordingly, conventional systems 200 generally experience debilitating issues with scaling, abrasion, plugging in the lines, lances, and other conveying surfaces in the system 200.

One prior approach is depicted in FIG. 17. The system of FIG. 17 uses a positive or regenerative blower drawing in filtered ambient air. The entire air discharged from the blower is applied to the cone of the silo to fluidize the additive material (which is hydrated lime) and enhance the material flow properties from the silo by aeration. Since hydrated lime is a natural $CO_2$ sorbent, the hydrated material in the silo removes a percentage of the $CO_2$ from the applied air as it bubbles through the silo. This method also serves to remove moisture from the applied air since $Ca(OH)_2$ is a hygroscopic material. The lean $CO_2$ and $H_2O$ air stream is then pulled from the head space of the silo by a fan at the exit of a dust collector. The exhaust from the dust collector fan is then used to supply the motive air supply blower and convey material from the feeder at the bottom of the silo cone. The resulting conveyance air has lowered $CO_2$ and moisture content.

While this system demonstrated significant reliability and pneumatic handling improvements, it can have limitations. Successful acid gas mitigation requires that the inherently high reactivity of hydrated lime be preserved. By first using the hydrated lime as a $CO_2$ sorbent, this system converts expensive highly reactive hydrated lime to calcium carbonate and delivers the carbonate form mixed with degraded hydrated lime. The system introduces water to the stored sorbent in the silo originating from the carbonate reaction. Water can agglomerate the finely sized calcium hydroxide particles and ultimately impact the ability of this material to be subsequently metered from the silo and conveyed to and effectively dispersed within the duct.

The system has failed in operation. The time-to-failure can be described as the time required for the carbonate scale to form and occlude the system to the extent that material can no longer be conveyed, at which point a labor-intensive mechanical cleaning of the conveyance system internal surfaces or component replacement is required. Another limitation of the the system is that the level of $CO_2$ removed varies with the material level in the silo. Because the silo level changes over time, the delivered motive air quality will vary. In other words, the silo level is directly proportional to the contact time between the air and sorbent. Thus, lower silo levels result in lower contact times, thereby introducing variability to the $CO_2$ concentration in the carrier gas.

These problems increase the necessity for time-consuming and expensive manual cleaning and maintenance of the introduction system due to precipitate and scale formation.

SUMMARY

These and other needs are addressed by the various aspects, embodiments, and configurations of the present disclosure. The aspects, embodiments, and configurations are directed generally to the delivery of additives to contaminated gas streams.

In one aspect, a method includes the steps:

(a) compressing, by a compressor, a carrier gas to form a compressed carrier gas;

(b) contacting an additive with the compressed carrier gas to form an additive-containing fluid; and (c) introducing the additive-containing fluid into a contaminated gas stream.

In another aspect, a system includes:

(a) a carrier gas treatment system to compress a carrier gas and form a treated carrier gas stream;

(b) a mixing system to contact additive particles with the treated carrier gas stream and form an additive-containing fluid; and (c) a delivery system to introduce the additive-containing fluid into the contaminated gas stream.

The above aspects can address effectively additive clogging problems. Compressed gas, particularly when coupled with a downstream dryer, can remove moisture effectively, provide a low dew point, and maintain a relatively low gas temperature, thereby providing effective thermal and moisture management. Lowering the moisture content would lower the enthalpy of the conveyance air and improve conveyance performance through the elimination of heat. Moisture removal from compressed air can be much easier than moisture removal from air downstream of a positive displacement (PD) or regenerative (regen) blower. Thermal and moisture maintenance can minimize substantially water-based hydration interactions with alkaline materials, particularly lime, sodium bicarbonate, and trona, thereby leading to reduced agglomeration and/or caking of additive to conveyance system surfaces.

The compressor and compressed air dryer combination foot print can be much smaller than the footprint of a dehumidifier, blower, and after cooler combination.

A compressed air system can allow for easier system and component redundancy. For a given volume of air, the piping is smaller and easier to install valves to switch between other trains and/or compressors. It can have a simpler electrical and control layout. For example, it can avoid the need for supply breakers in a motor control center (MCC) for the dehumidifier, blower and refrigerated air dryer. Typically, only the compressor and air dryer are interlocked and controlled.

The compressor and dryer combination can require less power than the combination of a dehumidifier, blower, and refrigerated air dryer. Since the combination can require less equipment and less power is being consumed, an arrangement with a compressor and air dryer can also decrease the cooling load for a room containing this equipment.

In another aspect, a system includes one or more lances for receiving an additive-containing fluid and introducing the additive-containing fluid into a contaminated gas stream. The lance(s) extend into the contaminated gas stream. The contaminated gas stream has a temperature above about 95° F. The lance(s) is cooled by a cooling medium to maintain an interior of the at least one lance at a temperature below the temperature of the contaminated gas stream.

Thermal management in the lance can further reduce clogging and scaling problems from alkaline additives by providing a cool, dry, and expanded compressed air as the motive carrier gas even when ambient air is used as the source of the carrier gas. This results from controlling system temperature to hinder carbonate formation versus controlling the small amount of ambient $CO_2$. As will be appreciated, the reaction kinetics for conversion of hydrate to carbonate is directly proportional to carrier gas temperature; therefore, higher carrier gas temperatures lead to increased formation of carbonates. Calcium carbonate is an inverse soluble salt; that is, as temperature increases, the formation and deposition of carbonate within the injection system also increases. Controlling the injection system and conveying fluid temperature can reduce the rate of carbonate formation and subsequently substantially minimize the deposition of calcium carbonate.

In another aspect, a system includes one or more lance(s) for receiving an additive-containing fluid and introducing the additive-containing fluid into a contaminated gas stream. The lance(s) comprises an eductor nozzle.

The eductor nozzle can provide a substantially uniform distribution of additive particles in the contaminated gas stream.

In another aspect, which may be used, independently or conjunctively, with the foregoing aspects, carbon dioxide is substantially removed or otherwise absent from the carrier gas. A carbon dioxide removal device can, for example, be positioned upstream or downstream of a carrier gas compressor.

More specifically, one method performs the following steps:

(a) compressing, by a compressor, a carrier gas including carbon dioxide to form a compressed carrier gas;

(b) removing most or all of the carbon dioxide from the compressed carrier gas to form a treated carrier gas;

(c) contacting an additive with the treated carrier gas to form an additive-containing fluid; and (d) introducing the additive-containing fluid into a contaminated gas stream.

A system configuration can include the following:

(a) a carrier gas treatment system to compress and remove most or substantially all of the carbon dioxide from a carrier gas and form a treated carrier gas stream;

(b) a mixing system to contact additive particles with the treated carrier gas stream and form an additive-containing fluid; and (c) a delivery system to introduce the additive-containing fluid into the contaminated gas stream.

Removal of carbon dioxide from the carrier gas source can be done by any number of techniques. For example, carbon dioxide removal may be done using sorbents either alone or in conjunction with a permeable and porous, fixed or fluidized sorbent bed or block, pressure/temperature swing process, carbon dioxide selective membrane, and/or cryogenic separator.

Removing carbon dioxide from the carrier gas can provide a number of benefits. Carbon dioxide can be removed on a reliable and affordable basis, particularly from compressed air systems. Such technologies may not be available for systems that use either regenerative or positive displacement blowers. Carbon dioxide removal can yield increased system reliability and gas conveyance system performance gain. Carbon dioxide is a necessary reactant for forming carbonates. While it may be advantageous to maintain air temperatures of less than 95° F., removing $CO_2$ can prevent or inhibit the carbonate reaction, avoid dependence on maintaining this air temperature, and provide greater system operational flexibility. By contacting the carrier gas with the carbon dioxide separator upstream of the point of contact with the additive, the system can substantially preserve and maintain inherently high reactivity of hydrated lime with acid gas. Typically, the additive, upon injection into the contaminated gas stream is substantially free of carbonates, more typically no more than about 5 wt. %, even more typically no more than about 1 wt. %, more typically no more than about 0.5 wt. %, and even more typically no more than about 0.1 wt. % of the additive introduced by the additive introduction system into the contaminated gas stream are carbonates.

In another aspect, a method includes the steps:

(a) detecting, by a processor, a stimulus associated with cleaning of an additive introduction system, the additive introduction system delivering an additive into a contaminated gas stream;

(b) terminating, by the processor, a supply of additive while continuing to supply a carrier gas to the additive introduction system;

(c) determining, by the processor, whether a gas flow is acceptable;

(d) when the gas flow is not acceptable, terminating, by the processor, the supply of the carrier gas to the additive introduction system; and (e) passing a purge gas through the additive introduction system to remove deposited additive or a derivative thereof.

In another aspect, a method includes the steps:

(a) detecting, by a processor, a stimulus associated with cleaning of an additive introduction system, the additive introduction system delivering an additive into a contaminated gas stream;

(b) terminating, by the processor, a supply of additive to the additive introduction system; and (c) passing a chemical cleaner through the additive introduction system, the cleaner removing substantially deposits of the additive and/or an additive derivative from the additive introduction system.

An automated cleaning sequence can not only reliably and periodically clean the introduction system but also minimize substantially demands on personnel to perform manual system cleaning and maintenance.

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces) or chemisorption (characteristic of covalent bonding). It may also occur due to electrostatic attraction.

"Ash" refers to the residue remaining after complete combustion of the coal particles. Ash typically includes mineral matter (silica, alumina, iron oxide, etc.).

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Coal" refers to a combustible material formed from prehistoric plant life. Coal includes, without limitation, peat, lignite, sub-bituminous coal, bituminous coal, steam coal, waste coal, anthracite, and graphite. Chemically, coal is a macromolecular network comprised of groups of polynuclear aromatic rings, to which are attached subordinate rings connected by oxygen, sulfur, and aliphatic bridges.

A "compressor" is a mechanical device that compresses a gas (e.g., air or natural gas).

A "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

A "dehumidifier" reduces the level of humidity in the air. Mechanical/refrigerative dehumidifiers, the most common type, usually work by drawing moist air over a refrigerated coil with a small fan and/or a desiccant material. Since the saturation vapor pressure of water decreases with decreasing temperature, the water in the air condenses, and drips into a collecting bucket. The air is then reheated by the warmer side of the refrigeration coil. Electronic dehumidifiers use a peltier heat pump to generate a cool surface for condensing the water vapor from the air.

An "eductor" is an aspirator, also called an eductor-jet pump or filter pump, is a device that produces vacuum by means of the Venturi effect. In an aspirator, fluid (liquid or gaseous) flows through a tube which then narrows. When the tube narrows, the fluid's speed increases, and because of the Venturi effect, its pressure decreases. Vacuum is taken from this point.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 3 wt. % (dry basis of the coal) while "medium sulfur coals" refer to coals having between about 1.5 and 3 wt. % (dry basis of the coal) and "low sulfur coals" refer to coals having a total sulfur content of less than about 1.5 wt. % (dry basis of the coal).

"Lime" refers to a caustic alkaline earth metal substance, such as calcium hydroxide ($Ca(OH)_2$), calcium oxide, and mixtures thereof produced by heating limestone.

"Particulate" refers to fine particles, such as fly ash, unburned carbon, soot and fine process solids, typically entrained in a mercury-containing gas stream.

"Rotary valve," "rotary airlock," or rotary feeder refers to a device used to meter, enter, or extract material between two chambers of different pressures. Most often such a device is used as a measuring or metering device.

"Saltation velocity" refers to superficial operating gas velocity and is dependent on the physical characteristics of the solids being conveyed, the desired particle mass flow rate, the physical characteristics of the additive induction system, and the thermo-chemical environment of the conveying fluid.

"Particle slip velocity" refers to the difference in the particle velocity and the superficial operating gas velocity and is dependent on the physical characteristics of the solids being conveyed.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

A "vortex cooler" is a mechanical device that separates a compressed gas into hot and cold streams. It typically has no moving parts. Pressurized gas is injected tangentially into a swirl chamber and accelerates to a high rate of rotation. Due to the conical nozzle at the end of the tube, only the outer shell of the compressed gas is allowed to escape at that end. The remainder of the gas is forced to return in an inner vortex of reduced diameter within the outer vortex.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Overview

The current disclosure is directed to an additive introduction system to introduce additives to control contaminant emissions from contaminant evolving facilities, such as smelters, autoclaves, roasters, steel foundries, steel mills, cement kilns, power plants, waste incinerators, boilers, and other contaminated gas stream producing industrial facilities. Although any contaminant may be targeted by the additive introduction system, typical contaminants include acid gases (e.g., sulfur-containing compounds (such as sulfur dioxide and trioxide produced by thermal oxidation of sulfides), nitrogen oxides (such as nitrogen monoxide and dioxide), hydrogen sulfide ($H_2S$), hydrochloric acid (HCl), and hydrofluoric acid (HF)), mercury (elemental and/or speciated), carbon oxides (such as carbon monoxide and dioxide), halogens and halides, particulates (e.g., fly ash particles and other types of unburned carbon), and the like. Although the contaminant is typically evolved by combustion, it may be evolved by other oxidizing reactions, reducing reactions, and other thermal processes such as roasting, pyrolysis, and autoclaving, that expose contaminated materials to elevated temperatures.

Figure 1:
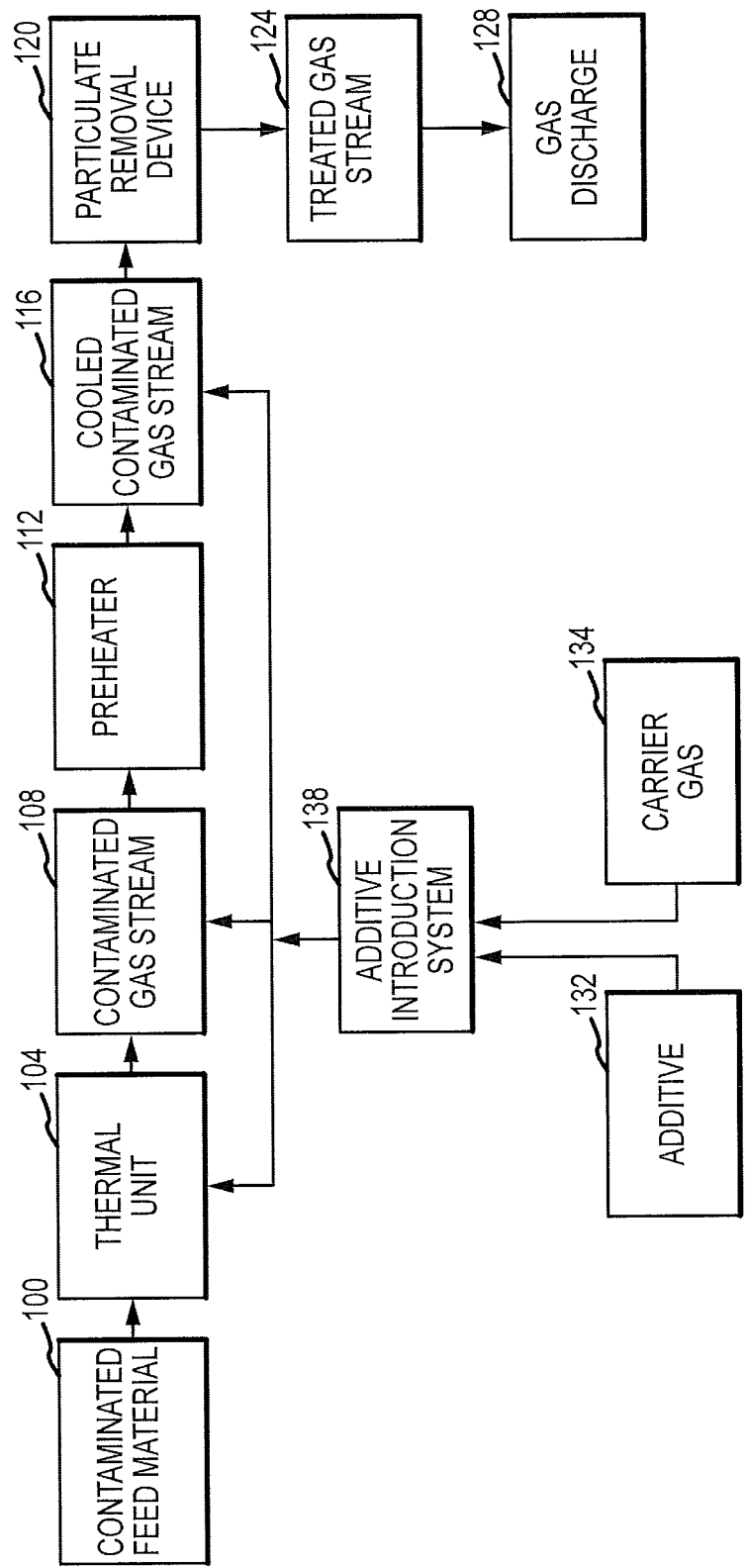
FIG. 1 is a block diagram according to an embodiment.
Figure 2:
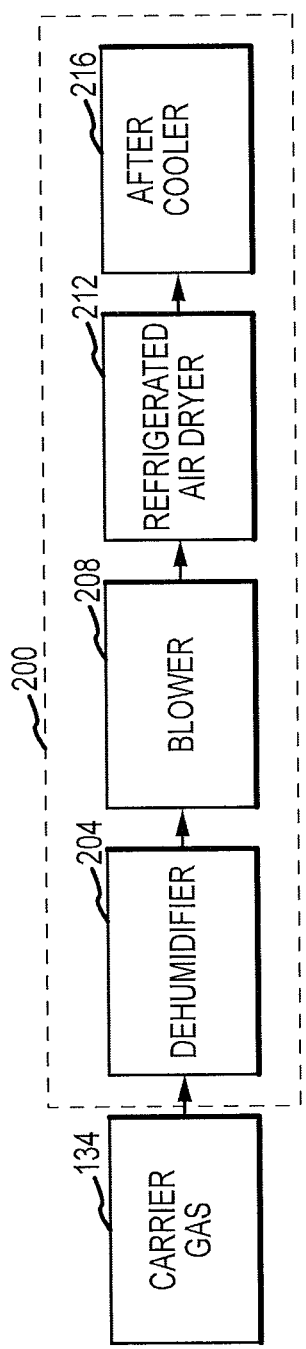
FIG. 2 is a block diagram according to the prior art.

FIG. 1 depicts a contaminated gas stream treatment process for an industrial facility according to an embodiment. Referring to FIG. 1, a contaminated feed material 100 is provided. In one application, the feed material 100 is combustible and can be any synthetic or natural, contaminate-containing, combustible, and carbon-containing material, including coal, petroleum coke, and biomass. The feed material 100 can be a high alkali, high iron, and/or high sulfur coal. In other applications, the present disclosure is applicable to noncombustible, contaminant-containing feed materials, including, without limitation, metal-containing ores, concentrates, and tailings.

The feed material 100 is heated in thermal unit 104 to produce a contaminated gas stream 108. The thermal unit 104 can be any heating device, including, without limitation, a dry or wet bottom furnace (e.g., a blast furnace, puddling furnace, reverberatory furnace, Bessemer converter, open hearth furnace, basic oxygen furnace, cyclone furnace, stoker boiler, cupola furnace, a fluidized bed furnace, arch furnace, and other types of furnaces), boiler, incinerator (e.g., moving grate, fixed grate, rotary-kiln, or fluidized or fixed bed, incinerators), calciners including multi-hearth, suspension or fluidized bed roasters, intermittent or continuous kiln (e.g., ceramic kiln, intermittent or continuous wood-drying kiln, anagama kiln, bottle kiln, rotary kiln, catenary arch kiln, Feller kiln, noborigama kiln, or top hat kiln), or oven.

The contaminated gas stream 108 generally includes a number of contaminants. A common contaminated gas stream 108 includes mercury, particulates (such as fly ash), sulfur oxides, nitrogen oxides, hydrochloric acid (HCl), carbon oxides, and unburned carbon.

The contaminated gas stream 108 is optionally passed through the preheater 112 to transfer some of the thermal energy of the contaminated gas stream 108 to air input to the thermal unit 104. The heat transfer produces a common temperature drop in the contaminated gas stream 108 of from about 500° C. to about 300° C. to produce a cooled contaminated gas stream 116 temperature commonly ranging from about 100 to about 400° C.

The cooled contaminated gas stream 116 is next subjected to particulate removal device 120 to remove most of the particulates from the contaminated gas stream and form a treated gas stream 124. The particulate removal device 120 can be any suitable device, including a wet or dry electrostatic precipitator, particulate filter such as a baghouse, wet particulate scrubber, and other types of particulate removal device.

The treated gas stream 124 is emitted, via gas discharge 128, into the environment.

To control contaminant emissions in the treated gas stream 124, an additive 132 entrained in a carrier gas 134 is introduced into the thermal unit 104, contaminated gas stream 108, or cooled contaminated gas stream 116 by an additive introduction system 138. To entrain the additive particles effectively, the additive particles typically have a mean, median, and $P_{90}$ size of no more than about 100 microns and even more typically ranging from about 2 to about 50 microns. The additive-containing fluid typically includes from about 0.10 to about 6.0 lbm material to lbm air (at standard temperature and pressure).

The additive employed depends on the contaminant targeted. By way of example, an alkaline material, such as lime or a bicarbonate, can be used to control emissions of sulfur oxides (SOx), hydrochloric acid (HCl), and hydrofluoric acid (HF). Powdered activated carbon ("PAC") can be used to control a variety of contaminants, such as gaseous heavy metals dioxins, furans, mercury, and hydrocarbons. Sodium esquicarbonate (trona) can be used to control emissions of sulfur oxides (SOx), hydrogen sulfide ($H_2S$), hydrochloric acid (HCl), and hydrofluoric acid (HF). Halogens and halides can be used to facilitate control mercury emissions. Metal oxides, such as magnesium oxide or magnesium hydroxide, can be used to control acid gas emissions. Sodium carbonate ("soda ash") can be used to control particulate and acid gas emissions.

Although the carrier gas for the additive can be any substantially inert gas (relative to the additive), a common carrier gas is air. Typically, the carrier gas includes a minor amount, more typically no more than about 400 $ppm_v$ vol. %, and even more typically no more than about 390 $ppm_v$ of an additive reactive component, such as carbon dioxide, that reacts with the additive. For example, carbon dioxide reacts with lime to produce calcium carbonate.

The Additive Introduction System

Figure 3:
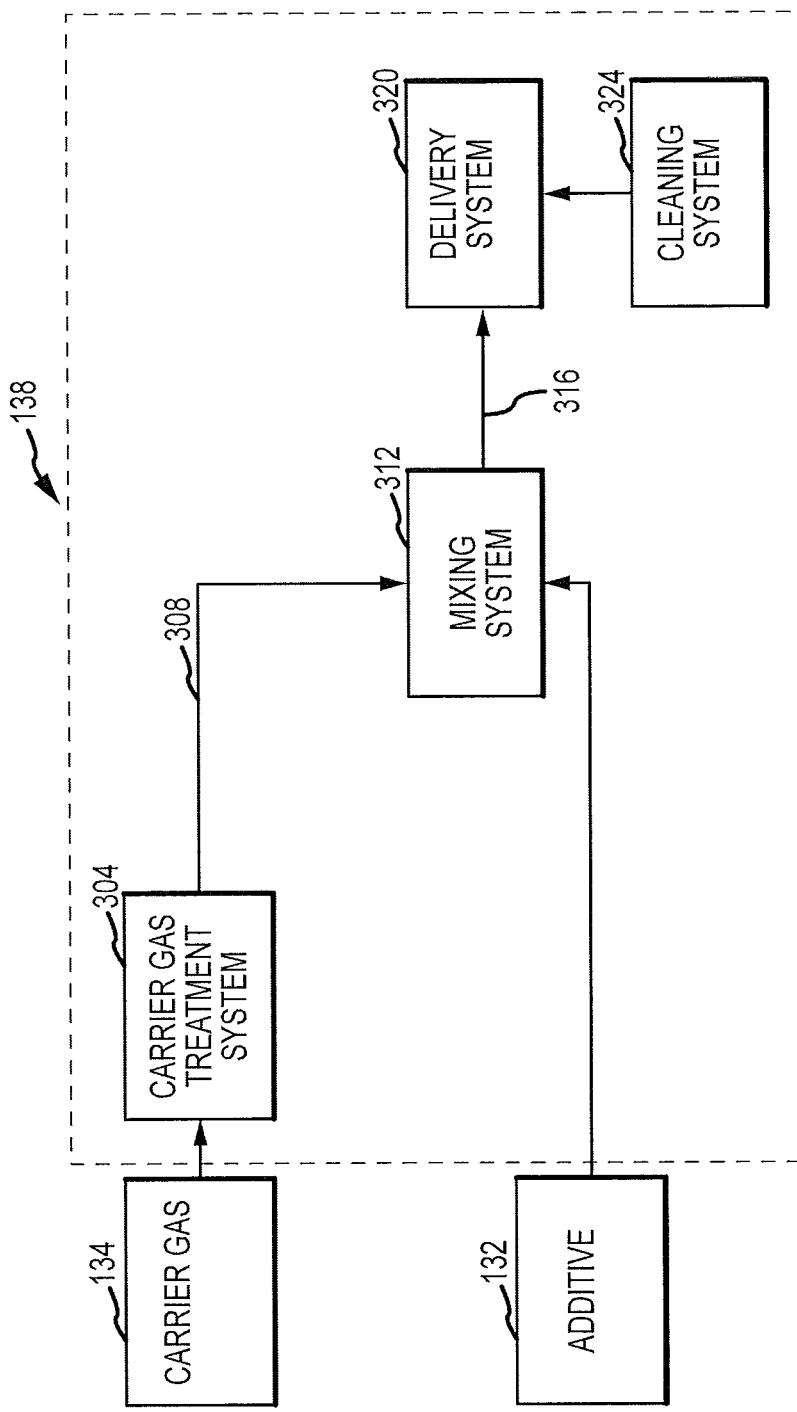
FIG. 3 is a block diagram according to an embodiment.

FIG. 3 depicts an additive introduction system 138 according to an embodiment. The system 138 includes a carrier gas treatment system 304 to form a treated carrier gas 308, a mixing system 308 to form the additive-containing fluid 316, a delivery system 320 to introduce the additive-containing fluid 320 into the contaminated gas stream 108, and a cleaning system 324 to remove substantially all scale and other deposits from the mixing and delivery systems 312 and 320.

While not wishing to be bound by any theory, for lime additives the formation of carbonate scale on a metal surface is believed to follow a specific sequence of stages. An induction period initiates the scale accumulation. "Induction" is the moment at which the carbonate starts to nucleate and the entrained carbonate particles start to deposit on the interiors surfaces of the additive introduction system. The deposition is affected by the level of carbonate in the carrier gas, surface temperature, material flow rate, surface configuration, and surface composition. For scale to form on the metal surfaces of the mixing and delivery systems 308 and 320, carbonate must impinge upon, stick to, and subsequently bond to the metal surfaces. Once attached to the surface, carbonate bonding will strengthen over time, significantly affected by the thermal environment, surface temperature, and carrier gas temperature. The scale can be subjected to dehydration, encouraged through conductive heating originating from the metal surfaces of the system.

It is believed that carbonate deposition in pneumatic conveying systems can be ameliorated by adherence to system-wide thermal management. Thermal management of the system can retard the growth and strengthening mechanisms of carbonate and reduce the potential for the system to foul. Thermal management of the system comprises thermal management of the carrier gas and the temperature of the mixing and delivery system components 312 and 320.

Thermal management by the additive introduction system 138 is discussed in detail below.

The Carrier Gas Treatment System

A number of design criteria are relevant to inhibiting or eliminating scaling. Preferably, the parts of the additive introduction system conveying the additive are maintained at a temperature of commonly less than about 95° F. and even more commonly less than about 90° F. to assure a relatively slow rate of carbonate formation, given the unavoidable presence of carbon dioxide in the carrier gas.

While not wishing to be bound by any theory, this temperature also determines the crystalline structure of any carbonate solids formed. The crystalline structure determines the abrasiveness of the carbonate solids and therefore the resulting wear on conveying surfaces in the additive introduction system. Other unique crystalline qualities encourage the adherence of the carbonate to additive introduction system components, material accumulation, and eventual system failure. The rhombohedral prismatic (calcite) crystal structure forms below a temperature in the range of about 90 to about 95° F. while the dendritic (aragonite) crystal structure forms above this temperature. The dendritic aragonite form adheres to surfaces more aggressively than calcite (which is a smooth crystal structure). Energy management can also be important. While not wishing to be bound by any theory, higher entrained additive particle velocities result in greater degrees of turbulence and areas of (unmanaged) impingement. Turbulence and impingement can generate localized heat. High velocity fluids can self-generate heat through surface friction. The resulting localized heating can accelerate carbonate particle and scale formation. To reduce localized heating, the additive introduction system should maintain laminar flow.

Figure 4:
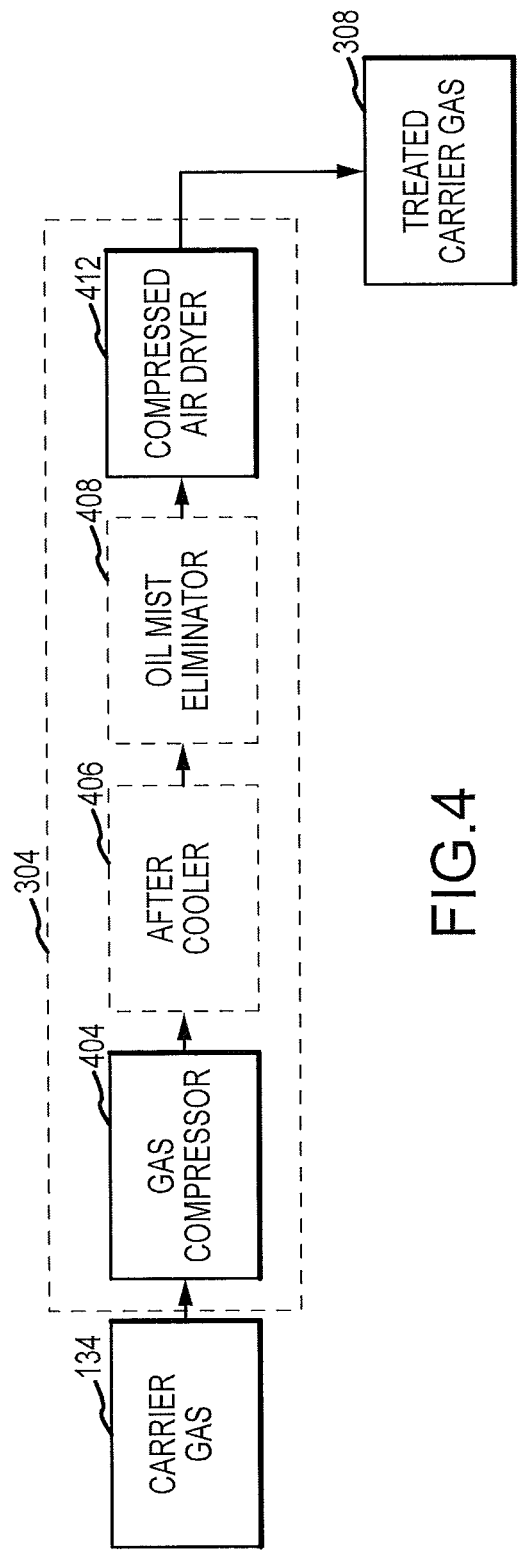
FIG. 4 is a block diagram according to an embodiment.

Referring to FIG. 4, the carrier gas treatment system 304 according to an embodiment includes a gas compressor 404 to form a compressed carrier gas 405, optional after cooler 406 to form a cooled compressed carrier gas 407, optional oil mist eliminator 408 to form a demisted carrier gas 409, and compressed gas dryer 312, which output treated carrier gas 308.

The treated carrier gas 308 typically has a temperature typically below about 95° F., more typically in the range of from about 75 to about 125° F., more typically in the range of from about 85 to about 115° F., and even more typically in the range of from about 85 to about 95° F., a total pressure of at least about 25 psi, more typically of at least about 50 psi, and even more typically ranging from about 60 to about 200 psi, a relative humidity of no more than about 10%, more typically of no more than about 5%, and even more typically of no more than about 1%, and a dew point of less than about 30° F., more typically of no more than about 0° F., even more typically of no more than about −25° F., and even more typically of no more than about −40° F. As will be appreciated, the dew point is inversely proportional to the gas pressure. Higher gas pressures cause more moisture to condense.

The compressor 404 can be any type of gas compressor. The compressor 404 can be open, hermetic, or semi-hermetic. Suitable compressor types include positive displacement and dynamic compressors. Positive displacement compressors include reciprocating (e.g., single or double acting or diaphragm compressors) or rotary (e.g., lobe, liquid ring, screw, scroll, and vane compressors). The compressor can be an oil-free compressor, thereby eliminating the optional oil mist eliminator 408. The degree of compression of the carrier gas (air) relative to atmospheric pressure typically ranges from about 1.10:1 to about 1.60:1 and even more typically from about 1.20:1 to about 1.35:1. The after cooler 406 can be any suitable cooling device. Examples include air conditioner, gas cooler, heat exchanger (using a heat exchange medium), radiator (commonly with a fan), thermoelectric chiller, vortex cooled chiller, venturi vortex cooler, and other types of gas cooling devices or surfaces.

The oil mist eliminator or removal device 408 is used when the compressor experiences a significant amount of oil leakage or slip. The device 408 removes most, if not all, of the oil mist from the compressed carrier gas 405 to form a demisted carrier gas 409. An exemplary oil mist eliminator is a coalescent filter.

The compressed gas dryer 412 can be any suitable gas dryer, such as a single tower deliquescent dryer, refrigerated and regenerative compressed air dryer, natural gas and biogas dryer, dessicant, adsorbent and deliquescent desiccant, and dehumidifier.

The combination of a compressor 404 followed by a compressed gas dryer 412 to remove a significant percentage of the moisture from the carrier gas can provide unexpected and surprising benefits. The combination commonly removes most, if not all, more commonly at least about 75%, and even more commonly at least about 90% of the moisture in the carrier gas, thereby making the carrier gas less capable of retaining heat energy. Removal of the moisture therefore simplifies maintaining the compressed air in the desired temperature range.

Figure 5:
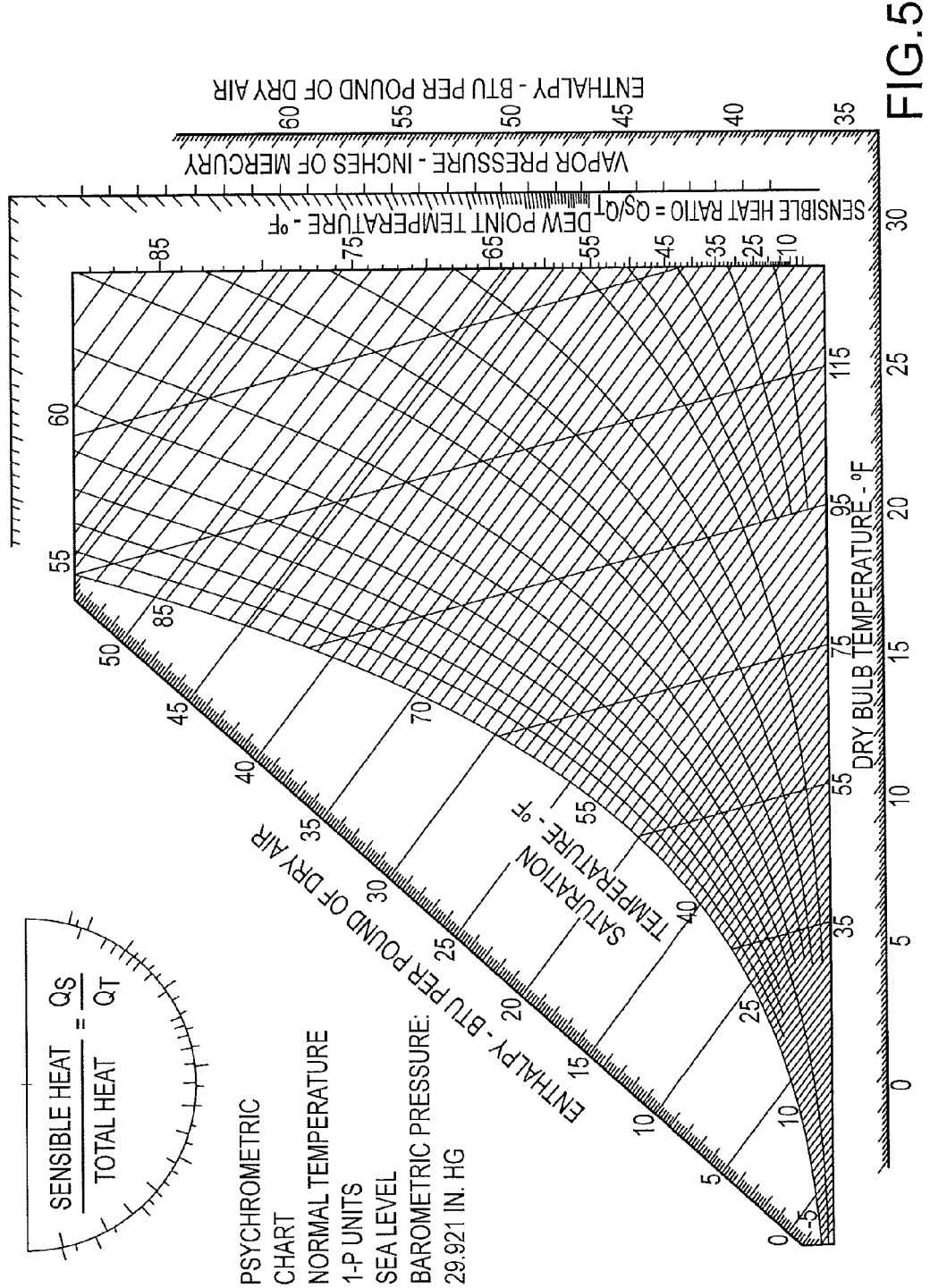
FIG. 5 depicts a psychrometric chart at atmospheric pressure illustrating a decrease in moisture and temperature leads to decreased enthalpy.
Figure 6:
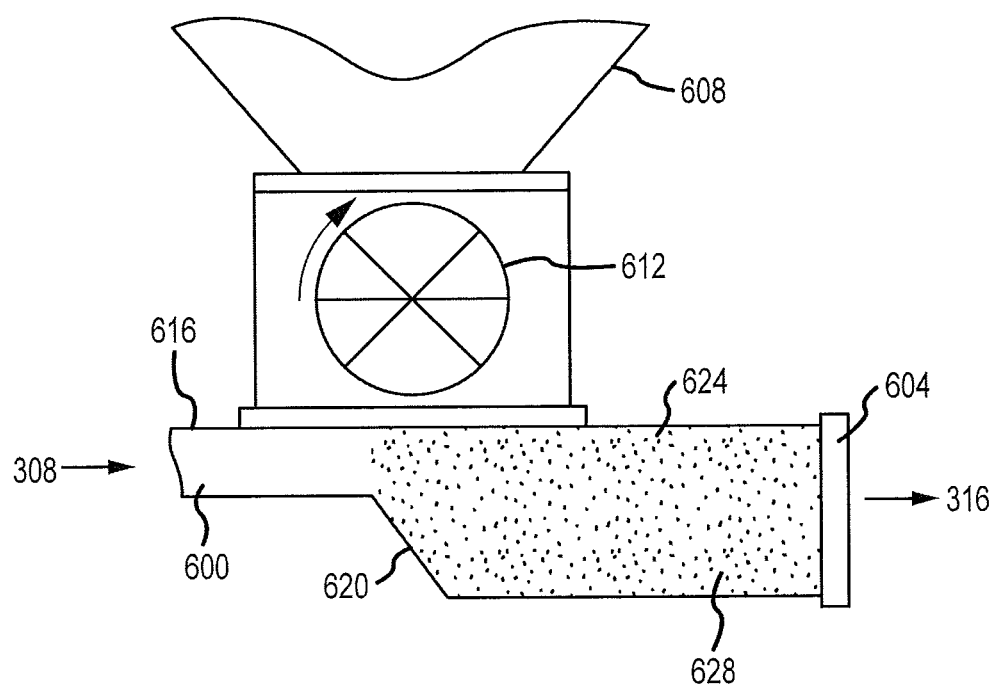
FIG. 6 is a block diagram according to an embodiment.

The substantial benefit that can be realized from moisture removal is depicted in FIG. 5. FIG. 5 is a psychrometric chart. As temperature and moisture content of air lessen, FIG. 5 shows that the gas can carry less heat (enthalpy). The less enthalpy the gas carries means the less the gas will contribute to carbonate formation. The mitigation of the carbonate reaction, in turn, can moderate the further production of moisture, which results as a product of the hydrated lime-carbon dioxide reaction.

FIG. 5 is shown by way of demonstration and not limitation. The diagram is for atmospheric pressure. A similar relationship exists for gases at higher pressure, which typifies the gas operating pressures of the system described in the present disclosure.

Figure 16:
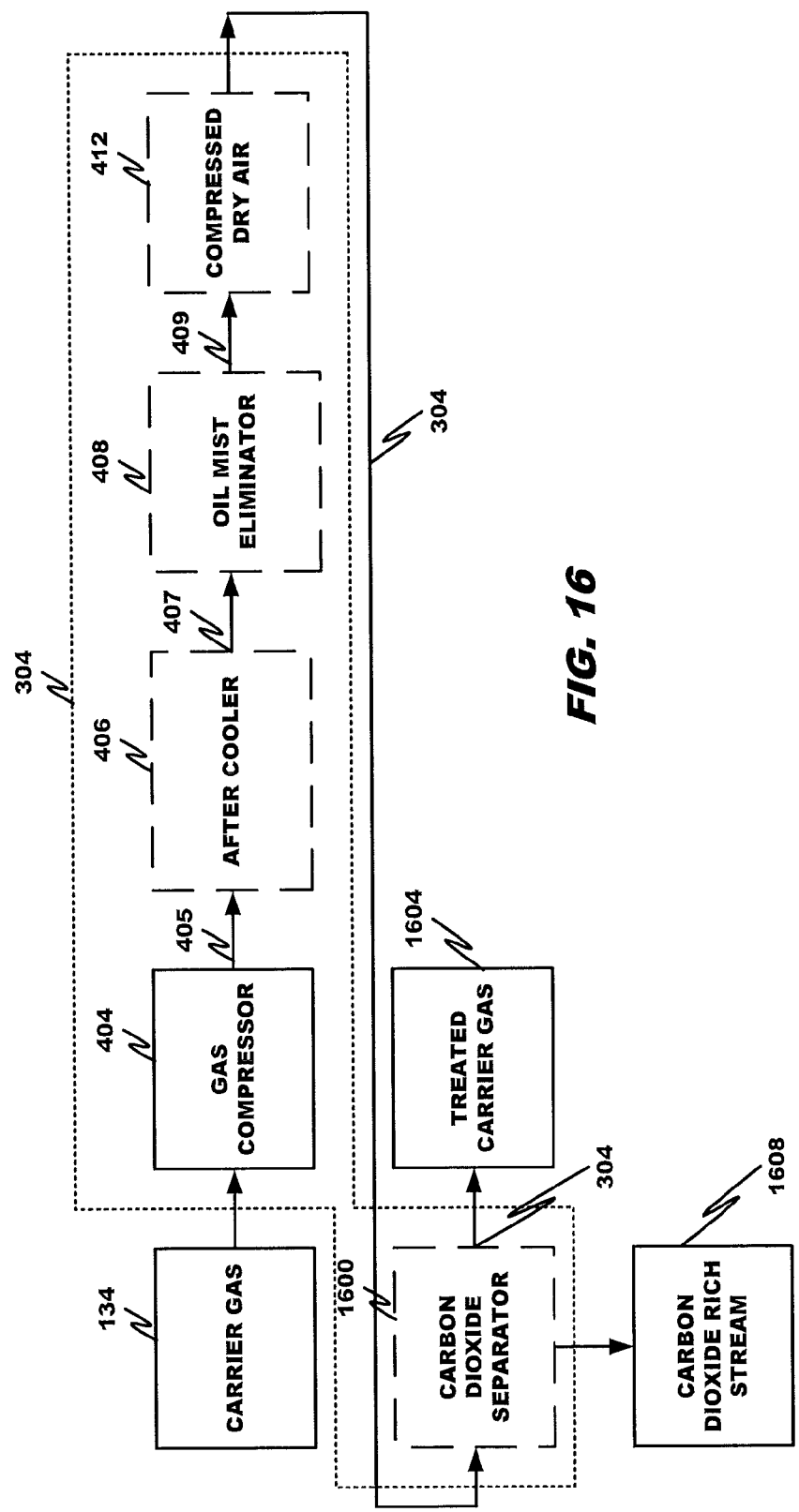
FIG. 16 is a block diagram according to an embodiment.
Figure 17:
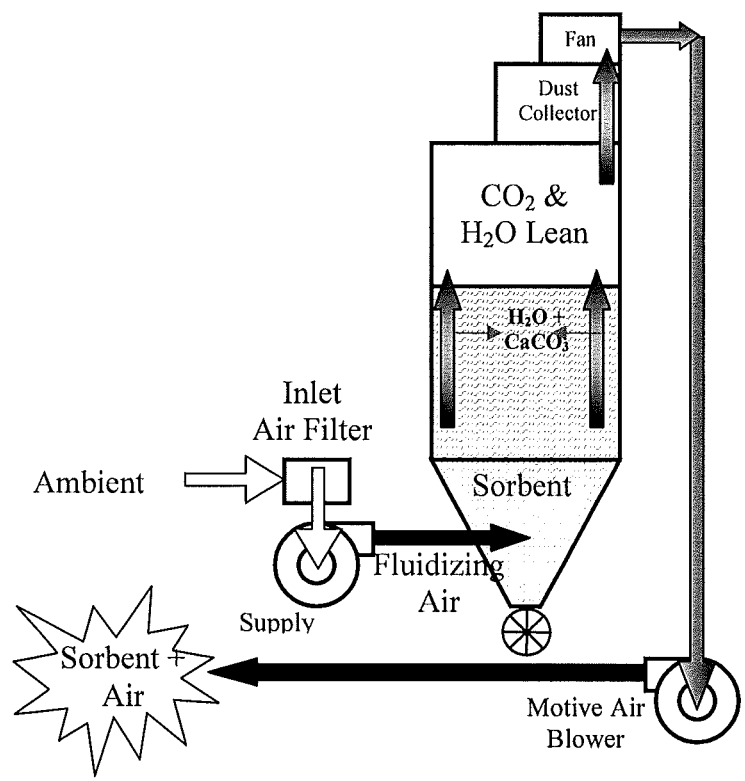
FIG. 17 is a block diagram according to the prior art.

An alternative carrier gas treatment system 304 is shown in FIG. 16. The system 304 is the same as that of FIG. 4 except for the inclusion of the carbon dioxide separator 1600 and the ability to use air as the carrier gas substantially independent of the temperature and moisture levels of the carrier gas in the additive introduction system 138. As noted, a major cause of the undesired formation of calcium sulfate stems from the reaction of carbon dioxide in the carrier gas with alkaline additives, particularly calcium hydroxide. Since carbon dioxide is an artifact of using ambient air as the carrier gas source, it is available for reaction in either the conveying air or in the flue gas that contaminates the conveyance air through leakage or recirculation to the additive introduction system. Although thermal and moisture management can generally control carbonate formation, it is still desirable to reduce levels of carbon dioxide in the carrier gas at a point upstream of contact with the additive. This need is addressed by the carrier gas treatment system 304 of FIG. 16.

Referring to FIG. 16, the demisted gas 409 (which may alternatively be the compressed carrier gas 405 or cooled compressed carrier gas 407) typically contains at least about 392 ppm carbon dioxide, more typically from about 390 to about 395 ppm carbon dioxide, and even more typically from about 391 to about 393 ppm carbon dioxide. Stated another way, carbon dioxide has a partial vapor pressure in the demisted gas 409 (which may alternatively be the compressed carrier gas 405 or cooled compressed carrier gas 407) typically of at least about 0.0392 bar, more typically from about 0.0390 to about 0.0395 bar, and even more typically from about 0.0391 to about 0.0393 bar. Since the motive air is taken directly from the nearby atmosphere, the $CO_2$ concentration in the motive air is generally directly proportional to ambient concentrations. Stated differently, the inlet $CO_2$ concentration is generally proportional to ambient $CO_2$ concentration. A similar relationship exists for the partial pressure of $CO_2$ in the demisted gas 409 (which may alternatively be the compressed carrier gas 405 or cooled compressed carrier gas 407).

The total pressure of the compressed carrier gas typically ranges from about 7.5 to about 9.6 bar.

The demisted gas 409 (which may alternatively be the compressed carrier gas 405 or cooled compressed carrier gas 407) is treated by the carbon dioxide separator 1600 to produce a treated carrier gas 1604 and carbon dioxide rich stream 1608. The carbon dioxide separator 1600 generally removes at least about 50%, more typically at least most, more typically at least about 75%, more typically at least about 85% and even more typically at least about 95% of the carbon dioxide from the demisted gas 409 (which may alternatively be the compressed carrier gas 405 or cooled compressed carrier gas 407) and concentrates the removed carbon dioxide in the carbon dioxide rich stream 1608. Commonly, the concentration of carbon dioxide in the treated carrier gas 1604 is less than the concentrations in the carbon dioxide rich stream 1608 and the gas 304, more commonly no more than about 175 ppm, more commonly no more than about 60 ppm, more commonly no more than about 30 ppm, and even more commonly no more than about 15 ppm. Stated another way, carbon dioxide has a partial vapor pressure in the treated carrier gas 1604 typically less than the carbon dioxide partial pressure in the carbon dioxide rich stream 1608 and the gas 304, typically of no more than about 0.015 bar, more typically from about 0.06 to about 0.015 bar, and even more typically from about 0.02 to about 0.006 bar. Commonly, the concentration of carbon dioxide in the carbon dioxide rich stream 1608 may be determined using conservation of mass relationships.

The carbon dioxide separator 1600 can be any suitable device for removing carbon dioxide from a gas stream, such as air. These devices can be used in the range of pressures over which most gas compressors deliver compressed gas (which pressure range is typically from about 6.5 to about 11.5 bar). As will be appreciated, by one of ordinary skill in the art, suitable devices generally fall into the two major categories of membrane- and desiccant-based systems. Exemplary devices include pressure swing adsorption devices, sorbent (e.g., desiccant) based systems, selective membranes for removing $CO_2$ molecules from the gas stream, and/or cryogenic separation (which produces a substantially liquid carbon dioxide-rich stream). The carbon dioxide separator 1600 is commonly incorporated into the system as an inline $CO_2$ removal device downstream of the motive air compressor 404 to remove typically most, if not all, of the $CO_2$ prior to the compressed gas being expanded and contacted with the additive. The $CO_2$-free treated carrier gas 1604 then conveys the additive 132 into the duct and, in the absence of $CO_2$, cannot react to form carbonate scale in the additive introduction system 138 regardless of system moisture and temperature levels.

The efficacy of removing carbon dioxide from the compressed carrier gas 405 can obviate the need for one or more of the other components, namely the after cooler 406, oil mist eliminator 408, and even the gas compressor itself 404. In other words, a blower or other gas pressurizing device can be used to provide a motive force to the carrier gas.

Mixing System

The mixing system 312 includes a treated carrier gas 308 manifold inlet 600, additive-containing fluid 316 manifold outlet 604, additive particle hopper 608, feed metering mechanism 612, and manifold 624 and introduces additive particles 628 into the treated carrier gas 308 to form an additive-containing fluid 316. The metering mechanism, in one configuration, is a rotary valve but can be any suitable feeding mechanism, such as a screw feeder or rotary air lock.

The mixing system 312 uses adiabatic expansion of the compressed carrier gas to further cool and remove moisture from the carrier gas. Conventional additive introduction systems use large conveying lines that require more space and manual manipulation when switching gas streams. Compared to a conventional additive introduction system, the mixing system 312 uses a much smaller compressed air conduit 616 up to the point of metering. Typically, the diameter of the conduit 616 is no more than about 2 inches and even more typically ranges from about ½" to about 1½" inches. The cross-sectional area of the conduit 616 is commonly no more than about 3.14 $in^2$ and even more commonly ranges from about 0.19 $in^2$ to about 1.77 $in^2$.

The conduit cross-sectional area normal to carrier gas flow gradually expands as a result of inclined or arcuate surface 620 to a much larger cross-sectional area. The gradual expansion inhibits turbulence in the gas flow. The expanded flow cross sectional area in the mixing system is selected to provide a flow velocity at the manifold outlet 604 sufficient to entrain the additive particles. The superficial operating gas flow velocity is typically at least the saltation velocity plus qualification for the particle slip velocity, more typically ranges from about –54% to about 154% of the saltation velocity plus qualification for the particle slip velocity, and even more typically ranges from about 115% to about 125% of the saltation velocity plus qualification for the particle slip velocity. By way of example, the target superficial gas flow velocity, for a desired particle mass flow rate of 2000 lb/hr for a 32 micrometer (um) particle being conveyed in a 3-inch ID pipe and a conveying fluid temperature of 90° F., ranges from about 828 fpm to about 2773 fpm, and more typically ranges from about 1980 fpm to about 2250 fpm. The pressure of the carrier gas in the manifold typically drops to a pressure of no more than about 15 psig and more typically ranging from about 2 to about 5 psig. The flow cross sectional expansion from inlet conduit 616 to outlet 604 is typically at least about 300%, more typically ranges from about 300% to about 1600. As a result of the flow area expansion, the carrier gas flow velocity decreases.

Figure 7A:
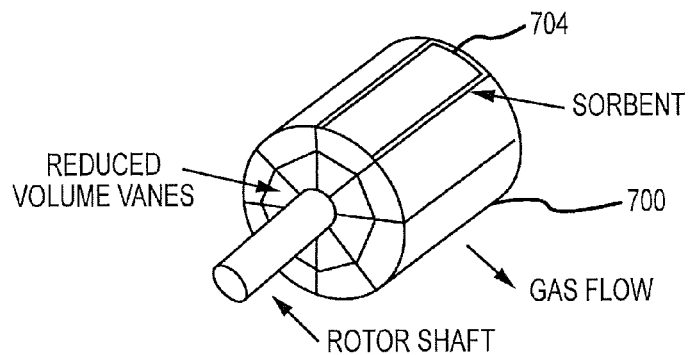
FIGS. 7A-B depict perspective and sectional views of a rotary valve according to a configuration.
Figure 7B:
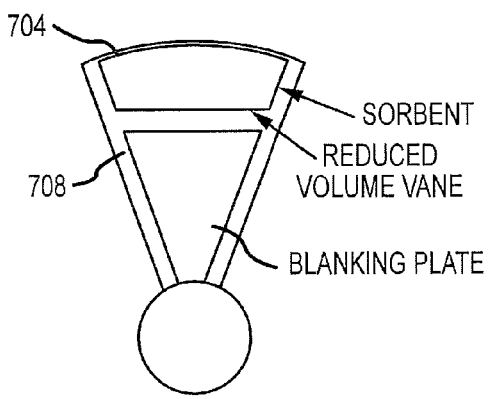

Referring to FIGS. 7A-B, a rotary valve 700 configuration of the metering device 612 is depicted. The rotary valve 700 includes a plurality of compartments 704 having common, predetermined volumes and separated by intervening vanes 708. Each compartment receives additive particles from hopper 608, rotates clockwise or counterclockwise (depending on the configuration), and drops the predetermined volume of the additive particles into the carrier gas. The rotational speed of the valve 700 determines the additive mass feed rate, or the mass of additive particles in a selected volume of the additive-containing fluid 316.

Figure 8:
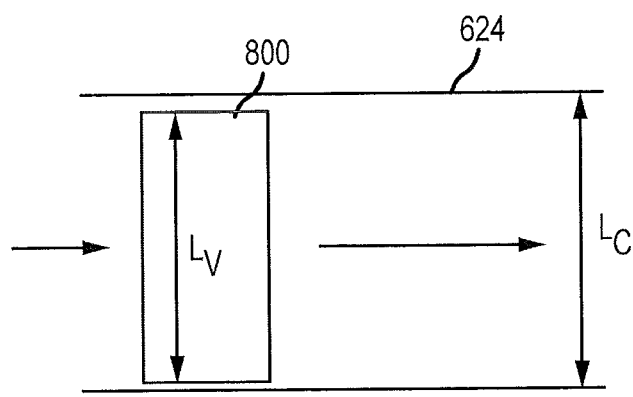
FIG. 8 is a top view of a portion of the embodiment of FIG. 6.

Compared to conventional rotary valves in additive introduction systems, the rotary valve 700 has a longer length for a more uniform additive particle dispersion in the carrier gas. Referring to FIG. 8, the length "$L_v$" of the rotary valve 700 is typically at least about 50%, more typically at least about 80%, and even more typically at least about 95% of the length "$L_C$" of the manifold 624. The use of an oversized rotary valve results in a larger vane area (face) than a rotary valve of an equivalent volume would otherwise possess. This allows the additive particles to be dispersed into the manifold below through a larger cross-section, resulting in superior entrainment of the sorbent within the conveyance air. The benefit to operations imparted by oversizing of the rotary valve directly decreases the rate of carbonate buildup to the system components.

Figure 9:
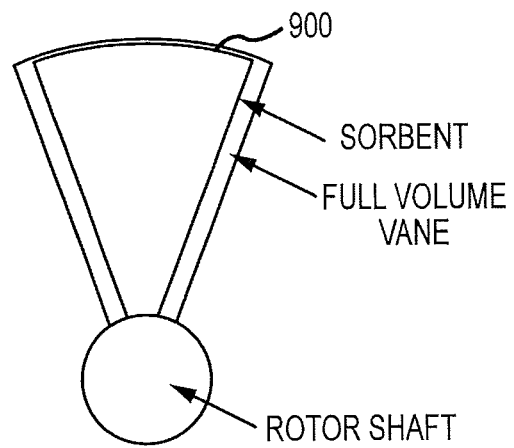
FIG. 9 depicts a sectional view of a rotary valve according to the prior art.
Figure 10:
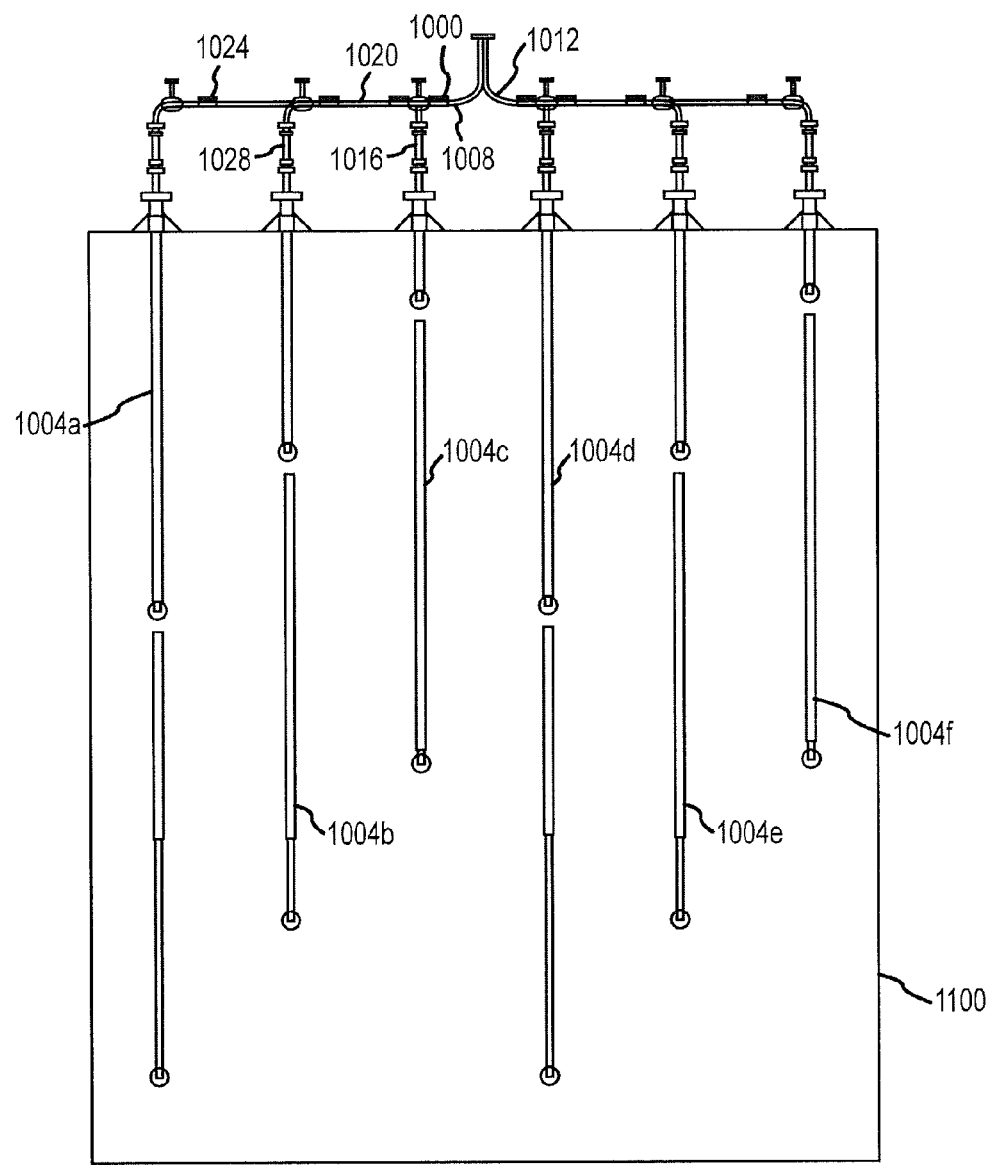
FIG. 10 depicts a delivery system according to an embodiment.
Figure 11:
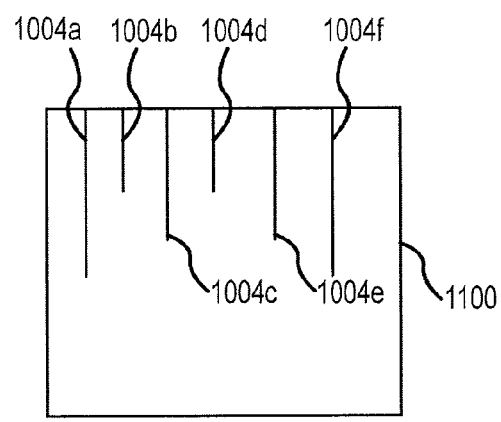
FIG. 11 depicts a configuration of the delivery system.
Figure 12:
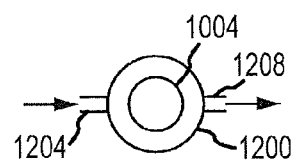
FIG. 12 depicts a heat exchanger on a lance according to one configuration.

The compartments 704 of the rotary valve 700 are differently configured than rotary valves of the prior art. FIG. 9 depicts a side sectional view of a rotary valve compartment 900 according the prior art. The additive particles fill the entire pie-shaped volume of the compartment 900. Referring to FIGS. 7A-B, the same sectional view of the rotary valve compartment 704 shows that only a portion of the pie-shaped area contains additive particles. A substantial portion of the pie-shaped portion has been blanked off. Typically, the volumetric rate of rotary valve ranges from about 0.05 ft$^3$/rev to about 0.50 ft$^3$/rev. Modification of the rotary valve 700 can be done by installing any device (such as a plate or block) in the pie-shaped area to effectively reduce the compartment volume, thereby allowing the oversized valve to feed a smaller amount of material. This can prevent batching at low feed rates because the rotor has to be turned faster.

The compartments of a circular rotary valve are, as shown, typically triangular in shape. By decreasing the pocket volume (by modifying the void geometry to a parallelogram versus a triangle) additive particles are less likely to become packed and stuck in the vane since, as the parallelogram-shaped vane/pocket is evacuated, the additive particles are normal to the void and gravity facilitates additive particle movement.

Using a positive (or negative) pressure manifold at the exit of the rotary valve can inhibit the carrier gas from contacting the vanes. Air contact with the vane is disadvantageous because air mixed with additive particles can result in increased abrasion to the vanes as well as issues with additive particle packing (as is the case with a blow-through style rotary valve). Additionally, any moisture or oil impurities will also be in contact with the vane surface. Since the positive (or negative) pressure manifold is below the rotary valve it allows the additive particles to be removed by gravity.

Returning to FIG. 6, the gas stream and the metered additive particles 620 are mixed in the flow manifold 624, and then conveyed out of the outlet 604 of the manifold 624. This allows for better, more uniform dispersion of the additive particles 620 into the larger flow area of the manifold 624.

The Delivery System

Referring to FIGS. 10-11, the additive-containing fluid 316 flows into the delivery system 320 for delivery to the contaminated gas. The system 320 comprises a manifold 1000 and a plurality of lances 1004. The lances 1004 project into the duct 1100, whereby the additive particles are dispersed substantially uniformly throughout the duct 1100 cross-sectional area. As will be appreciated, the delivery system can have only one lance.

Referring to FIG. 10, the manifold 1000 is a linear manifold using arcuate wyes 1010 to reduce additive particle abrasion from abrupt changes in flow direction and sizes the various conduits to maintain substantially constant flow cross-sectional areas normal to a direction of flow. By way of illustration, the first and second conduits 1008 and 1012 have substantially equivalent cross-sectional areas normal to flow, first conduit 1008 has substantially the same cross-sectional area normal to flow as the sum of the cross-sectional areas of the third and fourth conduits 1016 and 1020, the third conduit 1016 has substantially the same cross sectional area normal to flow as the sum of the cross-sectional areas normal to flow of the fifth and sixth conduits 1024 and 1028, and so forth. The term "substantially the same", for purposes of the present paragraph, means that the cross-sectional areas are typically within about 20%, even more typically within about 15%, and even more typically within about 10%.

The use of a linear manifold for distribution to the lances reduces the amount of additive particle impingement while allowing sufficient material partitioning and minimizing substantially energy losses to the walls of the delivery system. The manifold 1000 begins at the first point of additive material partitioning. A low degree of branch at the wye splits, reducing localized thermal loading due to impingement of the solids carried by the additive-containing gas 316 on the center of the wye and subsequent energy transfer to the system components. Reduction in impingement and subsequent localized thermal increase combine to minimize carbonate buildup at this point in the system. The use of passive portioning or eccentric components to manipulate material flow, movement and/or distribution within the linear manifold and manifold system is also contemplated.

In one configuration, each of the lances 1004 has a cooling sheath to reduce and maintain the temperature of the lance interior and therefore the additive-containing fluid to acceptable levels. As noted above with lime additives, a fluid temperature greater than about 95° F. can accelerate carbonate formation. By maintaining the lances at air and surface temperatures less than about 95° F. formation of scale in the lances, which are exposed to duct temperatures (typically at least about 300° F.), can be substantially inhibited. The cooling sheath can have any suitable heat exchange configuration, such as that shown in FIG. 12. The lance 1004 is surrounded by an outer sheath 1200 having an inlet 1204 and outlet 1208 for the cooling medium. Both counter-flow as well as in-flow types of lance cooling can be used. Other types of cooling sheath are a shell and tube, tube-in-tube, plate, adiabatic wheel, plate fin, pillow plate, fluid, dynamic scraped surface, phase-heat, direct contact, and spiral heat exchanger, HVAC air coil, and the like. Any heat exchange or cooling medium can be employed. The medium can, for example, be a gas (such as hydrogen gas or an inert gas), a liquid (such as water, Freon, an oil, and polyalkylene glycol), a molten metal or salt, a liquid gas, a nanofluid, or a solid (such as dry ice or water ice). The preferred cooling medium is clean dry air, after-cooled air, or water. The heat exchanged cooling medium can be cooled by any technique, such as an HVAC unit, waste heat recovery unit, a venturi vortex cooler, and the like.

Figure 13:
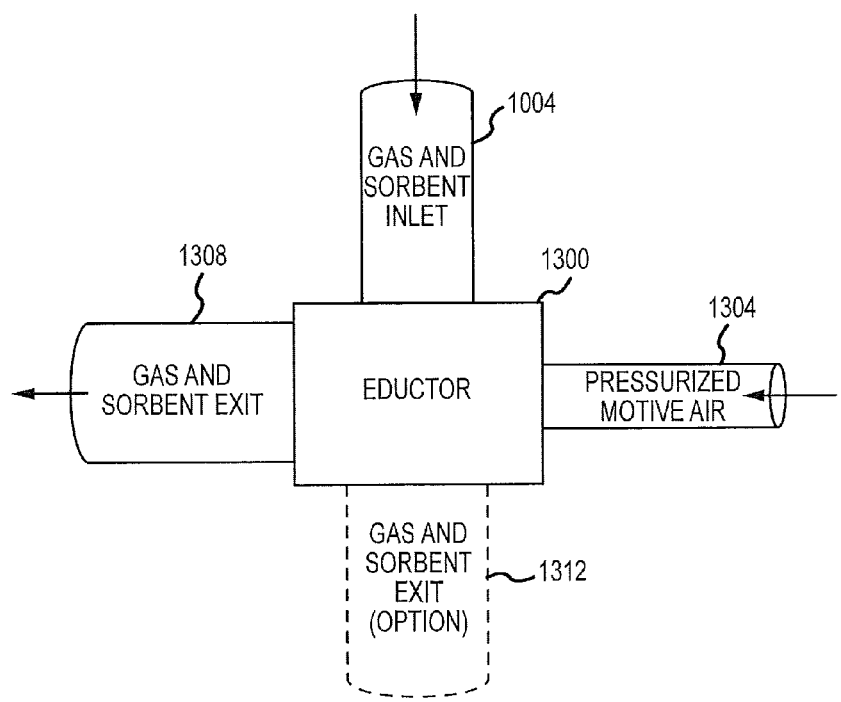
FIG. 13 is a block diagram depicting a delivery system according to an embodiment.

In one configuration shown in FIG. 13, the lances employ an eductor nozzle. While injecting at numerous points along the injection grid, small pressure differentials have been observed across a given injection array. These pressure differentials can cause non-uniform additive particle distribution as well as deterioration in injection array performance, such as scaling. Using a compressed gas (such as from the gas compressor 404) or a steam-driven venturi eductor at the end of every lance would not only serve to even the pressure distribution across an injection array but also would enhance in-duct distribution since the material leaving the eductor would be dispersed more evenly. While any type of eductor may be used, a ring eductor is preferred. Referring to FIG. 13, the tip of the lance 1004 includes an eductor 1300 and an inlet 1304 for a pressurized motive gas. The pressurized motive gas 1304 draws the additive-containing fluid 316 from the lance 1004 and introduces the additive-containing fluid 316 into the contaminated gas via one or both of the outlets 1308 and 1312.

In another embodiment, materials of construction are used by the additive introduction system to inhibit carbonate build-up. Materials of construction have been observed to have a direct effect on the control of carbonate build-up, which can lead to system fouling. Metallic cations (such as Zn(II)) have been observed to mitigate carbonate scale/crystallization fouling in industrial heat transfer applications. Use of specific materials or coatings, have been shown to be effective in reducing scale formation. The use of zinc plating, a coating of inert polymers, or a ceramic coating on internal additive introduction system surfaces suspected of being impinged by conveyed material is believed to lead to reduced carbonate formation.

The Cleaning System

Carbonate precipitates become harder over time. Regular pneumatic cleaning to remove small amounts of carbonate precipitates agglomerated additive deposits that have formed can prevent the precipitated or agglomerated material from becoming "scale" which would require mechanical or other type of cleaning. Conventional additive introduction systems use pinch valves to isolate injection array components. These types of valves show increased wear due to abrasion, resulting in increased maintenance and decreased system availability.

Figure 14:
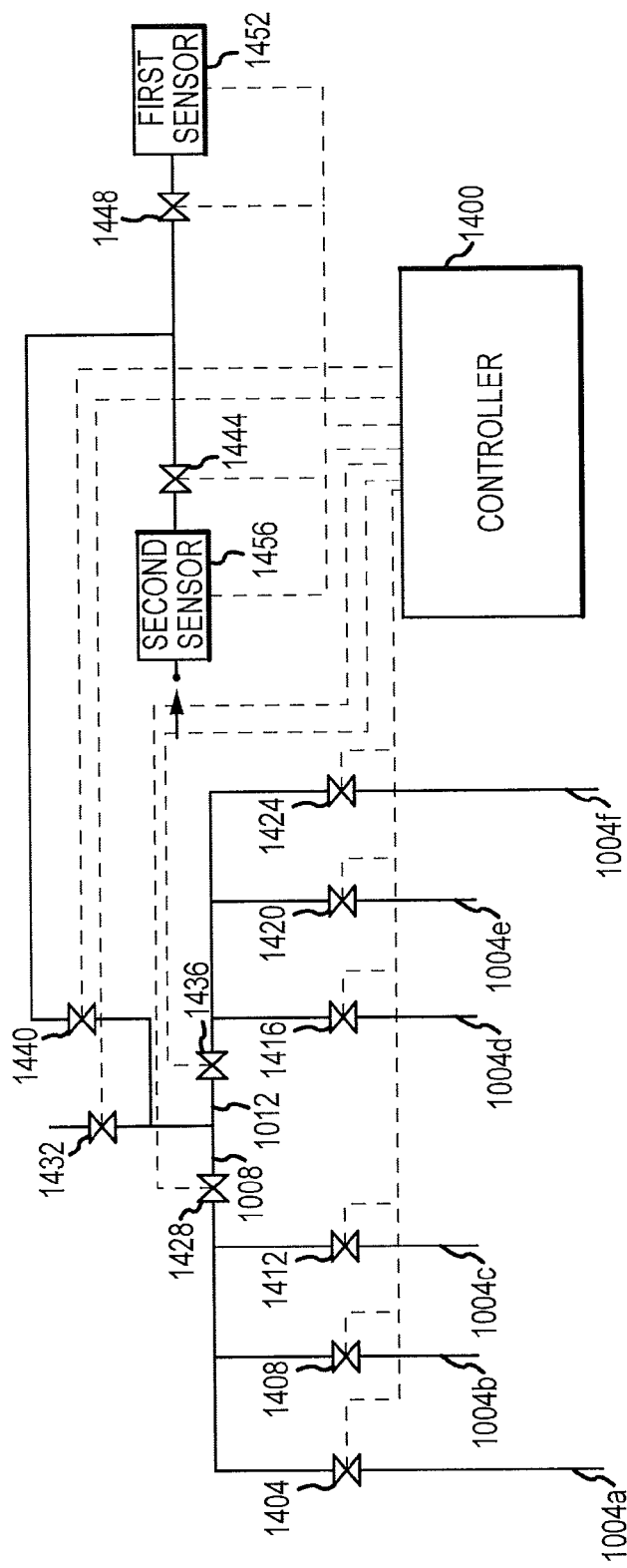
FIG. 14 depicts a cleaning system according to an embodiment.

In one configuration, the cleaning system involves a short duration shutdown of additive particle delivery to the mixing and delivery systems 312 and 320, while the carrier gas remains in-service. During the additive conveyance shutdown, various portions of the injection array are isolated and preventatively cleared of substantially all of the residing material using compressed carrier gas. The cleaning system 320 uses manual and/or multiple motor operated valves (which are typically ball valves) in conjunction with an automated controller 1400 (FIG. 14) to sequence the cleaning cycle. The dashed lines in FIG. 14 represent control/feedback lines from the controller 1400 to the various components. Before and after each valve sequence, the duct draw (or 'blow') for positive pressure injection locations) is quantified directly, parametrically assessed, and/or measured. Additionally the amount of compressed air used to blow through the location over a given time period is also quantified directly, parametrically assessed, and/or measured. This methodology gives an indication of the propensity of individual lances that plug or have reduced flow (when logged by a data historian) and an effective non-mechanical means to clean them, a historical reference of individual lances that plug or have reduced flow (when logged by a data historian), and a historical reference of carbonate buildup or material agglomeration in individual lances (since as carbonate buildup or material agglomeration occur the amount of compressed air that can flow through is limited, much in the way that an orifice serves as a flow restriction). Observing the degradation of the ability of the carrier gas to flow through the system gives a direct measurement of reduced flow versus the 'go' or 'no-go' methodology. The configuration measures and compares flow measurements through an instrument, such as, but not limited to, a mass flow meter or flow measuring venturi, to measure and compare changes in flow over time. These measurements can be compared over time to determine when an alternate cleaning method is necessary to clean the system.

Figure 15:
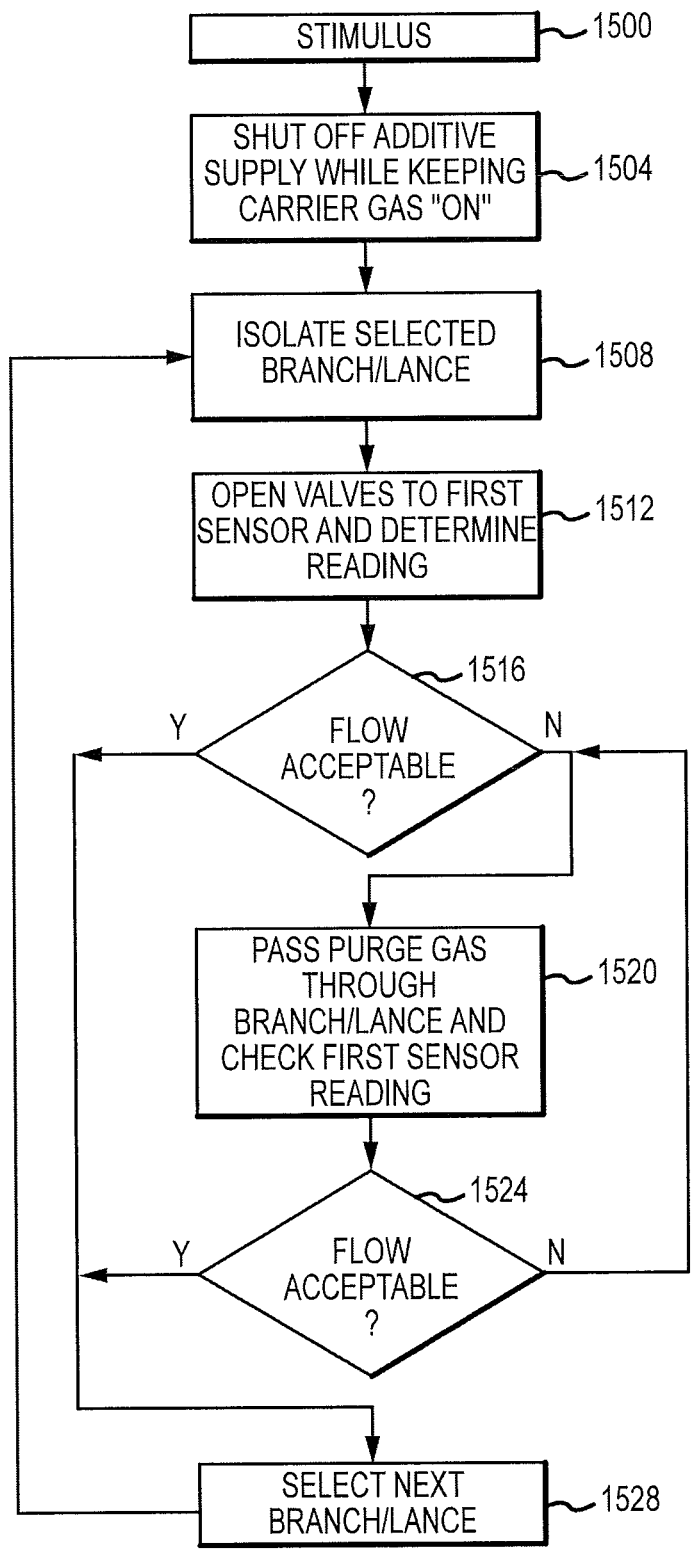
FIG. 15 is a flowchart of an embodiment according to an embodiment.

The configuration will now be discussed with reference to FIGS. 14-15.

In step 1500, the controller 1400 (which includes a processor and computer readable medium) identifies an instance of a stimulus. The stimulus can be, for example, passage of a selected time interval, a flow resistance measured across the mixing and/or delivery systems 312 and 320, and the like.

In response, the controller 1400, in step 1504, shuts off the additive supply (e.g., shuts off the rotary valve 612) while keeping the carrier gas "on" and flowing through the mixing and delivery systems 312 and 320. The carrier gas is flowed through the systems for a determined period of time to purge the systems.

In step 1508, the controller 1400 isolates a selected branch/lance of the delivery system 320. For example, lance 1004a is fluidly isolated by closing valves 1408, 1412, and 1436 while leaving valves 1404 and 1432 open.

In step 1512, the controller 1400 closes valves 1432 and 1444 and opens valve 1440 to place the selected lance 1004a in fluid communication with a first sensor 1452 (which is commonly open to the atmosphere). The first sensor 1452 then measures and provides to the controller 1400 the magnitude and/or direction of gas flow or the pressure differential of the duct draw (or 'blow' for positive pressure injection locations).

In decision diamond 1516, the controller 1400 determines whether the flow through the selected lance 1004a is acceptable. This can be done by comparing the duct draw measurement against historical measurements.

When the flow is not acceptable, the controller 1400, in step 1520, closes valve 1448 and opens valve 1444 to cause a determined amount of purge gas to pass, commonly in short bursts, through the second sensor 1456 and selected lance 1004a. The bursts can be formed by rapidly opening and closing a valve, such as valve 1444. The bursts can have a different characteristic (e.g., pressure, composition, temperature, and/or flow velocity) compared to the additive-containing fluid. The second sensor 1456 measures the purge gas flow volume through the lance 1004a. Valve 1444 is then closed and valve 1448 opened to measure the duct draw.

In decision diamond 1524, the controller 1400 determines whether the flow through the selected lance 1004a is acceptable.

When the flow is not acceptable, the controller 1400 returns to and repeats step 1516.

When the flow is acceptable, the controller 1400, in step 1528, selects a next branch/lance and returns to step 1508.

When each branch 1008 and 1012 and all lances 1004a-f have been cleaned, valve 1440 is closed and valves 1432, 1404, 1408, 1412, 1416, 1420, 1424, 1428, and 1436 are opened. The rotary valve 612 is activated, and the mixing and delivery systems returned to operation.

In another embodiment, the additive material collected in the mixing and delivery systems is removed chemically by a chemical cleaner. The chemical cleaner may be flowed through the mixing and delivery systems in the liquid or gas phases. Typically, the flow of the additive and carrier gas is terminated during chemical cleaning. In one configuration, the additive supply is terminated while the carrier gas supply is continued. The chemical cleaner is added to the flow of carrier gas, which removes the unwanted additive or additive derivative deposits. Over time and despite maintaining the mixing and delivery systems dry and cool, trace amounts of carbonate can form and ultimately may degrade the ability of the systems to convey material. These precipitates are typically removed by mechanical means, which most often requires manual cleaning. This requires maintaining a trained employed to serve in this capacity, or adding this function to an existing employee's job role. It also requires mechanical cleaning, which involves exposing a worker to alkaline materials and/or carbonates.

In this embodiment, a cleaning agent, such as a dilute mineral acid, is used to react with the carbonate formation to dissolve or remove it after some preset amount of plugging or reduced flow is discovered. The mineral acid could be a scrubbing solution, which contains dissolved acid gases, such as nitrogen oxides and sulfur oxides. Since the process is typically a closed system and initiated only when necessary, it serves to alleviate system downtime and contributes to the overall availability of the additive introduction system. Since the process is preferably a closed system, there can be minimal contact with personnel, reducing the risk and training required to perform this function.

EXPERIMENTAL

The following examples are provided to illustrate certain embodiments of the invention and are not to be construed as limitations on the invention, as set forth in the appended claims. All parts and percentages are by weight unless otherwise specified.

Experiment 1

An evaluation of the additive introduction system and other features disclosed herein was carried out on a coal-fired electric generating unit at full scale during a three-month period. The equipment employed during the evaluation was configured as disclosed herein and consisted primarily of a storage silo, a supplemental storage vessel, a compressed air motive package, modified rotary air lock, conveying structures, a linear distribution manifold with cleaning systems and injection lance array.

The evaluation was carried out to study the effectiveness of the additive induction system, the carrier gas treatment system, the mixing system, the delivery system and the cleaning system. The resulting efficiency and reliability of the disclosed components were evaluated in addition to the relative to effect of additive addition on air heater pressure drop, the effectiveness of the additive addition on particulate pollutant control, additive addition on heat transfer structure.

Additive addition was carried out initially at low mass feed rates (300-400 lb/hr) for limited duration (3-4 hours). As reliability of the disclosed components was established, additive addition rates were subsequently increased after verifying no adverse impacts on host unit operations (e.g., air heater pressure drop, particulate matter emissions, duct opacity, etc.). In the final phase of the evaluation, additive addition was increased to nearly 2000 lb/hour and sustained for 30 days. The duration of continuous, failure-free operations was 38 days.

A postmortem evaluation of disclosed components revealed that the system operated as conceived during design. Specific evaluation of typically high-failure areas showed no indication of wear, plugging or caking due to carbonate buildup.

A number of variations and modifications of the disclosure can be used. It would be possible to provide for some features of the disclosure without providing others.

For example in one alternative embodiment, external cooling or insulation is employed to substantially minimize the effects of heating from the surrounding environment (e.g., sun or some nearby process heat input). External cooling can be done by external cooling or insulation on the conveyance line.

In other embodiments, thermal management of the conveying system components is done by proximity to soil (earth) or installation in a trench or "covered pipe tray" to facilitate reduced thermal loading of system components.

In other embodiments, a venturi cooler is positioned downstream of the compressed gas dryer.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    compressing, by a compressor, a carrier gas comprising carbon dioxide to form a compressed carrier gas;
    removing, using one or more of a pressure swing, temperature swing, selective membrane, and cryogenic separator carbon dioxide removal device, at least most of the carbon dioxide from the compressed carrier gas to form a treated carrier gas;
    contacting an additive with the treated carrier gas to form an additive-containing fluid; and
    introducing the additive-containing fluid into a contaminated gas stream.

2. The method of claim 1, wherein at least about 75% of the carbon dioxide is removed from the compressed carrier gas and wherein a carbon dioxide concentration in the treated carrier gas is no more than about 100 ppm.

3. The method of claim 1, wherein the treated carrier gas has a temperature below about 95° F., a total pressure of not greater than about 25 psi, and a dew point of less than about 30° F., wherein a degree of compression of the carrier gas to form the compressed carrier gas ranges from about 1.10:1 to about 1.60:1 and further comprising forming a cooled compressed gas by at least one of:

cooling, by an after cooler, the compressed carrier gas; and cooling, by a vortex tube, the compressed carrier gas.

4. The method of claim 1, further comprising:

drying, by a compressed gas dryer, the compressed carrier gas to form a dried carrier gas, wherein the dried carrier gas is contacted with the additive in the contacting step and wherein a relative humidity of the dried carrier gas is no more than about 10%.

5. The method of claim 1, wherein the contacting step comprises the sub-steps:

expanding the compressed carrier gas to cool adiabatically the compressed carrier gas and form an expanded carrier gas, wherein a velocity of the expanded carrier gas is at least a saltation velocity; and releasing additive particles into at least one of the compressed carrier gas and expanded carrier gas to form the additive-containing fluid, wherein the additive particles are entrained substantially in the additive-containing fluid.

6. The method of claim 5, wherein a flow cross-sectional expansion from an inlet conduit to an outlet is at least about 300% and wherein the expanded carrier gas has a velocity from about 75% to about 95% of the compressed carrier gas.

7. The method of claim 5, wherein the additive particles are at least one of lime, a bicarbonate, and trona, wherein the additive particles are contacted with the at least one of the compressed carrier gas and expanded carrier gas by a rotary valve and wherein a length of the rotary valve is at least about 80% of a length of a manifold containing the at least one of the compressed carrier gas and expanded carrier gas.

8. The method of claim 1, wherein the introducing step comprises the sub-step:

passing the additive-containing fluid through a linear manifold and at least one lance, wherein a cross-sectional area normal to flow of the manifold is substantially the same as a cumulative cross-sectional area normal to flow of the at least one lance.

9. The method of claim 1, wherein the introducing step comprises the sub-step:

passing the additive-containing fluid through at least one lance, the at least one lance extending into the contaminated gas stream, the contaminated gas stream having a temperature above about 90° F., wherein the at least one lance is cooled by a cooling medium to maintain an interior of the at least one lance at a temperature below the temperature of the contaminated gas stream.

10. The method of claim 1, wherein the introducing step comprises the sub-step:

passing the additive-containing fluid through at least one lance, the at least one lance comprising an eductor nozzle.

11. The method of claim 1, wherein the additive-containing fluid is substantially free of carbonates, wherein the treated carrier gas has a pressure ranging from about 6.5 to about 11.5 bar (upstream of a point of contact with the additive) or about 1.25 to about 2 bar (downstream of a point of contact with the additive), and wherein a partial pressure of the carbon dioxide in the treated carrier gas is no more than about 0.1 bar.

12. A system, comprising:

a carrier gas treatment system to compress and remove at least most carbon dioxide from a carrier gas and form a treated carrier gas stream, wherein the carbon dioxide is removed by one or more of a pressure swing, temperature swing, selective membrane, and cryogenic separator carbon dioxide removal device;

a mixing system to contact additive particles with the treated carrier gas stream and form an additive-containing fluid; and a delivery system to introduce the additive-containing fluid into a contaminated gas stream.

13. The system of claim 12, wherein the carrier gas treatment system comprises a compressor to compress the carrier gas into a compressed carrier gas and wherein one or both of the selective membrane and a desiccant-based carbon dioxide removal device remove at least most of the carbon dioxide from at least one of the carrier gas and compressed carrier gas.

14. The system of claim 13, wherein the carrier gas treatment system comprises an after cooler to cool the compressed carrier gas and form a cooled compressed carrier gas.

15. The system of claim 13, wherein at least about 75% of the carbon dioxide is removed by the one or both of the selective membrane and the desiccant-based carbon dioxide removal device from the compressed carrier gas and wherein a carbon dioxide concentration in the treated carrier gas is no more than about 100 ppm.

16. The system of claim 12, wherein the carrier gas treatment system comprises a compressed gas dryer to dry the compressed carrier gas and form the treated carrier gas stream.

17. The system of claim 12, wherein the mixing system further comprises:

first and second conduits, the second conduit having a flow cross sectional area at least about 300% of a flow cross-sectional area of the first conduit, the first conduit being located upstream of the second conduit, whereby the treated carrier gas expands as the treated carrier gas flows from the first to the second conduit.

18. The system of claim 12, wherein the additive particles are at least one of lime, a bicarbonate, and trona, wherein the delivery system comprises a linear manifold and at least one lance, wherein a cross-sectional area of the manifold normal to the carrier gas flow is substantially the same as a cumulative cross-sectional area normal to flow of the at least one lance.

19. The system of claim 12, wherein the delivery system comprises at least one lance, the at least one lance extending into the contaminated gas stream, the contaminated gas stream having a temperature above about 90° F., wherein the at least one lance is cooled by a cooling medium to maintain an interior of the at least one lance at a temperature below the temperature of the contaminated gas stream and wherein the at least one lance comprises an eductor nozzle.

20. A method, comprising:
  treating a carbon dioxide-containing carrier gas to compress the carbon dioxide-containing carrier gas and remove at least most carbon dioxide from the carbon dioxide-containing carrier gas and form a treated carrier gas, wherein the carbon dioxide is removed by one or more of a pressure swing adsorption device, a temperature swing adsorption device, a lime-free desiccant based system, a carbon dioxide selective membrane, and cryogenic carbon dioxide separator;
  contacting the treated carrier gas with an alkaline additive material to form an additive-containing fluid; and
  introducing the additive-containing fluid into a contaminated gas stream.

21. The method of claim 20, wherein the treating step comprises the substep:
  reducing a dew point and temperature of the carrier gas to sufficient levels to substantially inhibit water-based hydration interactions with the alkaline additive material and wherein the additive-containing fluid has one or more of a dew point of no more than the carbon dioxide-containing carrier gas dew point and a gas temperature of no more than the carbon dioxide-containing carrier gas temperature.

* * * * *